United States Patent
Kawabata

(10) Patent No.: US 11,235,832 B2
(45) Date of Patent: Feb. 1, 2022

(54) STRADDLED VEHICLE

(71) Applicant: YAMAHA HATSUDOKI KABUSHIKI KAISHA, Iwata (JP)

(72) Inventor: Tomohiro Kawabata, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 126 days.

(21) Appl. No.: 16/739,628

(22) Filed: Jan. 10, 2020

(65) Prior Publication Data

US 2020/0223509 A1    Jul. 16, 2020

(30) Foreign Application Priority Data

Jan. 11, 2019  (JP) .............................. JP2019-003709
Sep. 12, 2019  (JP) .............................. JP2019-166463

(51) Int. Cl.
*B62K 11/02* (2006.01)
*F02M 35/16* (2006.01)
*F02B 61/02* (2006.01)

(52) U.S. Cl.
CPC .............. *B62K 11/02* (2013.01); *F02B 61/02* (2013.01); *F02M 35/162* (2013.01)

(58) Field of Classification Search
CPC ...... B62K 11/02; B62K 11/00; F02M 35/162; B62J 17/02; B62J 17/00; B62J 17/10
See application file for complete search history.

(56) References Cited

U.S. PATENT DOCUMENTS

| | | | |
|---|---|---|---|
| 8,276,998 B2 | 10/2012 | Tahara et al. | |
| 8,899,653 B2 * | 12/2014 | Usa .......................... | B62J 17/02 296/78.1 |
| 8,899,668 B2 * | 12/2014 | Yokouchi ............. | B62D 35/005 296/208 |
| 9,016,421 B2 * | 4/2015 | Kontani ................. | B62K 11/00 180/219 |
| 9,180,923 B2 * | 11/2015 | Yokouchi ............... | B62K 19/46 |
| 9,688,335 B2 * | 6/2017 | Ishikawa ................. | B62J 15/02 |
| 9,868,486 B2 * | 1/2018 | Hagimoto ............... | B62J 17/02 |
| 10,024,278 B2 * | 7/2018 | Mizuta .................... | B62J 17/02 |
| 10,144,473 B2 * | 12/2018 | Ishii ........................ | B62J 17/00 |
| 10,286,968 B2 * | 5/2019 | Niijima .................... | B62J 6/02 |
| 2007/0144802 A1 | 6/2007 | Tsuya | |

(Continued)

FOREIGN PATENT DOCUMENTS

EP    2949555 A1    12/2015
JP    2003072633 A   3/2003

(Continued)

*Primary Examiner* — Tony H Winner
*Assistant Examiner* — Michael R Stabley
(74) *Attorney, Agent, or Firm* — Rabin & Berdo, P.C.

(57) ABSTRACT

A straddled vehicle includes a radiator arranged forward relative to an internal combustion engine and an ECU arranged sideward of the internal combustion engine. At least a portion of a tubular air passage through which the air for cooling the ECU passes is formed between a support cover supporting the ECU and an outer cover. A front cover, an upper cover and an under cover form a groove portion, which extends rearward from a front end portion located upward and forward relative to the radiator and is recessed inward in the vehicle width direction. An inlet opening that communicates with the air passage is formed in the groove portion.

14 Claims, 16 Drawing Sheets

(56) References Cited

U.S. PATENT DOCUMENTS

2009/0242304 A1    10/2009   Tahara et al.
2011/0155493 A1    6/2011   Kogo et al.
2018/0118295 A1    5/2018   Haraguchi et al.

FOREIGN PATENT DOCUMENTS

JP    2006213250 A    8/2006
JP    2009241803 A    10/2009

\* cited by examiner

STRADDLED VEHICLE

TECHNICAL FIELD

The present invention relates to a straddled vehicle.

The present application claims priority from Japanese Patent Application No. 2019-003709, filed on Jan. 11, 2019, and Japanese Patent Application No. 2019-166463, filed on Sep. 12, 2019, which are incorporated by reference herein in its entirety.

BACKGROUND ART

Conventional straddled vehicles are known in the art that include an internal combustion engine and an electronic control unit for controlling the internal combustion engine, etc., wherein the electronic control unit is arranged sideward of the internal combustion engine. With such a straddled vehicle, the electronic control unit can be arranged in the vicinity of the internal combustion engine. Now, since the electronic control unit includes electronic parts, the temperature of the electronic control unit should be prevented from becoming high. If the electronic control unit is arranged in the vicinity of the internal combustion engine of a high temperature, the temperature thereof may become high.

Japanese Laid-Open Patent Publication No. 2009-241803 describes a motorcycle including a support case that supports the electronic control unit, wherein the support case is arranged between the internal combustion engine and the electronic control unit. Heat radiated from the internal combustion engine is blocked by the support case, the electronic control unit is prevented from being heated directly by the internal combustion engine. With the motorcycle disclosed in Japanese Laid-Open Patent Publication No. 2009-241803, a side cover is arranged outward in the vehicle width direction relative to the support case, and a passage through which air passes (hereinafter "air passage") is formed between the side cover and the support case. The side cover has an opening to be the inlet opening of the air passage. The opening of the inlet opening is facing forward. As the motorcycle runs, the air flows in the inlet opening and the air flows from the front side toward the rear side of the air passage. The electronic control unit is cooled by the air.

SUMMARY OF INVENTION

Technical Problem

With the motorcycle disclosed in Japanese Laid-Open Patent Publication No. 2009-241803, a radiator is arranged forward of the internal combustion engine. A coolant, which has become hot by cooling the internal combustion engine, flows inside the radiator. Thus, the radiator becomes hot. The radiator is a part for heat exchange between the hot coolant and the air. The air is heated while passing through the radiator to become a warm air and flow rearward of the radiator. In the motorcycle, the inlet opening of the air passage is provided rearward of the radiator as the vehicle is seen from the side. Therefore, the temperature of the air flowing into the air passage is higher as compared with a case where the radiator is absent. There is a problem that the effect of cooling the electronic control unit by the air flowing through the air passage is influenced by the radiator.

In order to increase the effect of cooling the electronic control unit, one may consider enlarging the inlet opening of the air passage. If the inlet opening is larger, the amount of air flowing through the air passage increases, and it is therefore possible to increase the effect of cooling the electronic control unit. However, if the amount of air flowing through the air passage increases, the pressure the side cover receives from the air increases. Therefore, it is necessary to increase the rigidity of a member that supports the side cover or the side cover itself so that the side cover does not come off outward in the vehicle width direction because of the air. This as a result may lead to an increase in the size or weight of the vehicle.

That is, when the inlet opening provided in the side cover is enlarged in order to increase the amount of air supplied to the electronic control unit, it will be in a so-called "bulge shape". In this case, when running at a high speed, the air hits a portion of the inner wall of the side cover that is located rearward of the inlet opening. Thus, it is possible to introduce more air into the air passage. However, the structure of the side cover around the inlet opening is likely to be a resistance to the air. The air introduced to the side cover generates a force to pull off the side cover outward in the vehicle width direction. It is necessary to increase the rigidity of a member that supports the side cover or the side cover itself so that the side cover does not come off outward in the vehicle width direction because of the air. This as a result may lead to an increase in the size or weight of the vehicle.

As another method for increasing the effect of cooling the electronic control unit, one may consider orienting the inlet opening of the air passage downward so that the air having been influenced by the heat of the radiator, i.e., the warmed air, does not come into the air passage. However, while the motorcycle runs, the air flows from the front side toward the rear side, it is difficult to take in a large amount of air through an inlet opening facing downward. Therefore, the amount of air flowing through the air passage may become insufficient, failing to increase the effect of cooling the electronic control unit.

Note that in a straddled vehicle, vehicle parts of which the temperature should be prevented from becoming high are not limited to the electronic control unit. For example, the regulator and the battery are also vehicle parts of which the temperature should be prevented from becoming high. Similar problems occur when such vehicle parts are arranged sideward of the internal combustion engine.

It is an object of the present invention, which has been made in order to solve the problem, to provide a straddled vehicle including a radiator arranged forward of the internal combustion engine and a vehicle part arranged sideward of the internal combustion engine, wherein it is possible to effectively cool the vehicle part.

Solution to Problem

A straddled vehicle according to the present invention includes: a vehicle frame including a head pipe; an internal combustion engine supported on the vehicle frame; a radiator supported on the vehicle frame and arranged forward relative to the internal combustion engine; a support cover arranged sideward of the internal combustion engine; a vehicle part supported on the support cover and arranged outward in a vehicle width direction relative to the support cover, wherein at least a portion of the vehicle part overlaps with the internal combustion engine as the vehicle is seen from the side; a front cover at least a portion of which is arranged forward of the head pipe; an upper cover at least a portion of which is arranged sideward of the head pipe and upward relative to the radiator; an under cover at least a portion of which is arranged sideward of the head pipe and downward of the upper cover; and an outer cover arranged outward of the support cover and the vehicle part in the vehicle width direction. A groove portion is formed by at least one of the front cover, the upper cover and the under cover, wherein the groove portion includes a front end portion located upward and forward relative to the radiator and a rear end portion located rearward relative to the front end portion, and wherein the groove portion extends rearward from the front end portion to the rear end portion and is depressed inward in the vehicle width direction. At least a portion of a tubular air passage through which air supplied to the vehicle part passes is formed by the support cover and the outer cover. The front end portion of the groove portion has an opening facing forward as the vehicle is seen from the side. An air inlet opening that communicates with the air passage is formed in the groove portion.

With the straddled vehicle described above, the vehicle part is arranged sideward of the internal combustion engine, but the support cover is arranged between the internal combustion engine and the vehicle part. Therefore, the vehicle part is prevented from being heated directly by the internal combustion engine. As the straddled vehicle runs, the air flows through the groove portion from the front end portion toward the rear side. Herein, the front end portion of the groove portion is located upward and forward relative to the radiator. Therefore, the air not influenced by the heat of the radiator is introduced into the groove portion. The air introduced into the groove portion is guided into the air passage, at least a portion of which is formed between the support cover and the outer cover, through the inlet opening. The vehicle part is cooled by the air flowing through the air passage. With the straddled vehicle, the air not influenced by the heat of the radiator flows through the air passage for cooling the vehicle part. Therefore, it is possible to effectively cool the vehicle part.

According to one preferred embodiment of the present invention, an area of passage cross section passing through a center of the inlet opening of the groove portion is smaller than an area of passage cross section passing through the front end portion of the groove portion.

Note that there is no particular limitation on the shape of the groove portion. For example, the dimension of the groove portion in the up-down direction may decrease from the front end portion toward the inlet opening. The dimension of the groove portion in the vehicle width direction may decrease from the front end portion toward the inlet opening.

According to the embodiment described above, the air introduced into the groove portion from the front end portion of the groove portion is compressed before reaching the inlet opening. Then, the compressed air is guided into the air passage through the inlet opening. Since the amount of air flowing through the air passage increases, it is possible to more effectively cool the vehicle part.

According to one preferred embodiment of the present invention, the inlet opening is formed upward and forward relative to the radiator.

According to the embodiment described above, it is possible to further reduce the influence of the heat of the radiator for the air introduced into the air passage. Therefore, it is possible to more effectively cool the vehicle part.

According to one preferred embodiment of the present invention, the inlet opening is formed forward and outward in the vehicle width direction relative to the radiator.

According to the embodiment described above, it is possible to further reduce the influence of the heat of the radiator for the air introduced into the air passage. Therefore, it is possible to more effectively cool the vehicle part.

According to one preferred embodiment of the present invention, the groove portion includes a vertical wall, an upper wall extending outward in the vehicle width direction from an upper end of the vertical wall, and a lower wall extending outward in the vehicle width direction from a lower end of the vertical wall. The inlet opening is formed in the upper wall.

The radiator is arranged downward relative to the groove portion. One of the vertical wall, the upper wall and the lower wall of the groove portion that is farthest away from the radiator is the upper wall. According to the embodiment described above, the air is guided to the air passage from a portion of the groove portion that is away from the radiator, and it is therefore possible to further reduce the influence of the heat of the radiator. Therefore, it is possible to more effectively cool the vehicle part. The air is guided into the groove portion from the front end portion of the groove portion whose opening is facing forward. Then, dust or rain, etc., may also possibly enter the groove portion together with the air. It is not preferred that the vehicle part is exposed to dust or rain. Being heavier than the air, dust or rain tends to flow through a lower portion of the groove portion as compared with the air. According to the embodiment described above, since the inlet opening is formed in the upper wall, it is possible to suppress the entry of dust or rain into the air passage. Dust or rain is likely to be guided along the lower wall of the groove portion to be discharged rearward of the groove portion.

According to one preferred embodiment of the present invention, the groove portion is inclined relative to a horizontal line so as to descend while extending from the front end portion toward the inlet opening.

According to the embodiment described above, since the groove portion is inclined relative to the horizontal line, the air flowing through the groove portion is likely to flow into the inlet opening formed in the upper wall. It is possible to increase the amount of air to be guided to the air passage. Therefore, it is possible to more effectively cool the vehicle part. It is also possible to further suppress the entry of dust or rain into the air passage.

According to one preferred embodiment of the present invention, the support cover includes a vehicle part attachment portion to which the vehicle part is attached, and a guide passage portion arranged forward of the vehicle part attachment portion and inward in the vehicle width direction of the upper cover. A guide passage that guides air from the inlet opening toward the vehicle part is formed in the guide passage portion.

According to the embodiment described above, the air in the groove portion flows into the guide passage through the inlet opening and is guided by the guide passage toward the vehicle part. According to the embodiment described above, the inlet opening is able to be provided at a more forward position. Therefore, the air unlikely to be influenced by the heat of the radiator is able to be introduced into the air passage. Therefore, it is possible to more effectively cool the vehicle part.

According to one preferred embodiment of the present invention, the straddled vehicle includes a rear cover arranged rearward of the vehicle part. A first outlet port that allows air to flow out of the air passage is formed between the outer cover and the rear cover.

As the straddled vehicle runs, the air flows rearward along the outer surface of the outer cover. The flow of the air serves to suck out the air from the air passage through the first outlet port. Since the air of the air passage is likely to flow out of the first outlet port, the flow velocity of the air through the air passage is increased. Therefore, it is possible to more effectively cool the vehicle part.

According to one preferred embodiment of the present invention, a second outlet port that allows air to flow out of the air passage is formed in a portion of the outer cover that is upward relative to the first outlet port.

According to the embodiment described above, the second outlet port is formed, in addition to the first outlet port, in the air passage. Even when a large amount of air flows into the air passage, the air smoothly flows out of the air passage. The air flowing through the air passage is unlikely to stagnate. Therefore, it is possible to more effectively cool the vehicle part.

According to one preferred embodiment of the present invention, the vehicle part is formed in a rectangular shape having a front edge, a rear edge, an upper edge and a lower edge as the vehicle is seen from the side. At least a portion of the first outlet port is located between a downward extension of the front edge and a downward extension of the rear edge and downward relative to the lower edge as the vehicle is seen from the side.

According to the embodiment described above, the air of the air passage is likely to flow around the vehicle part in accordance with the shape of the vehicle part. Therefore, it is possible to effectively cool the vehicle part.

According to one preferred embodiment of the present invention, the vehicle part is formed in a rectangular shape having a front edge, a rear edge, an upper edge and a lower edge as the vehicle is seen from the side. At least a portion of the second outlet port is located between a rearward extension of the upper edge and a rearward extension of the lower edge and rearward relative to the rear edge as the vehicle is seen from the side.

According to the embodiment described above, the air of the air passage is likely to flow around the vehicle part in accordance with the shape of the vehicle part. Therefore, it is possible to effectively cool the vehicle part.

According to one preferred embodiment of the present invention, the vehicle part is an electronic control unit that controls the internal combustion engine.

The electronic control unit is a vehicle part of which the temperature should particularly be prevented from increasing. According to the embodiment described above, it is possible to effectively cool the electronic control unit. Even though the electronic control unit is arranged sideward of the internal combustion engine, it is possible to sufficiently suppress an increase in the temperature of the electronic control unit.

Advantageous Effects of Invention

According to the present invention, it is possible to provide a straddled vehicle including a radiator arranged forward of the internal combustion engine and a vehicle part arranged sideward of the internal combustion engine, wherein it is possible to effectively cool the vehicle part.

DESCRIPTION OF EMBODIMENTS

Figure 1:
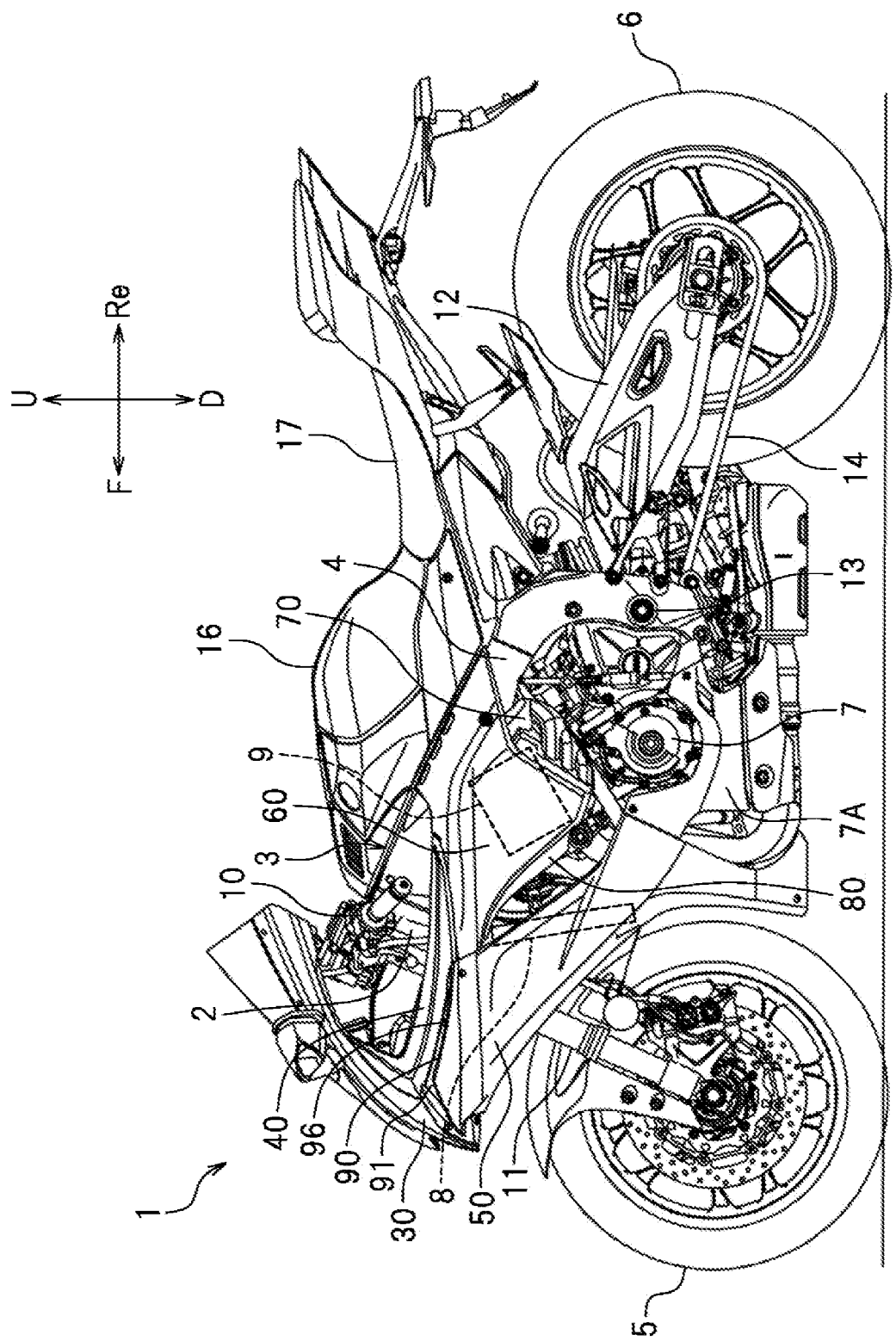
FIG. 1 is a left side view of a motorcycle according to an embodiment.
Figure 2:
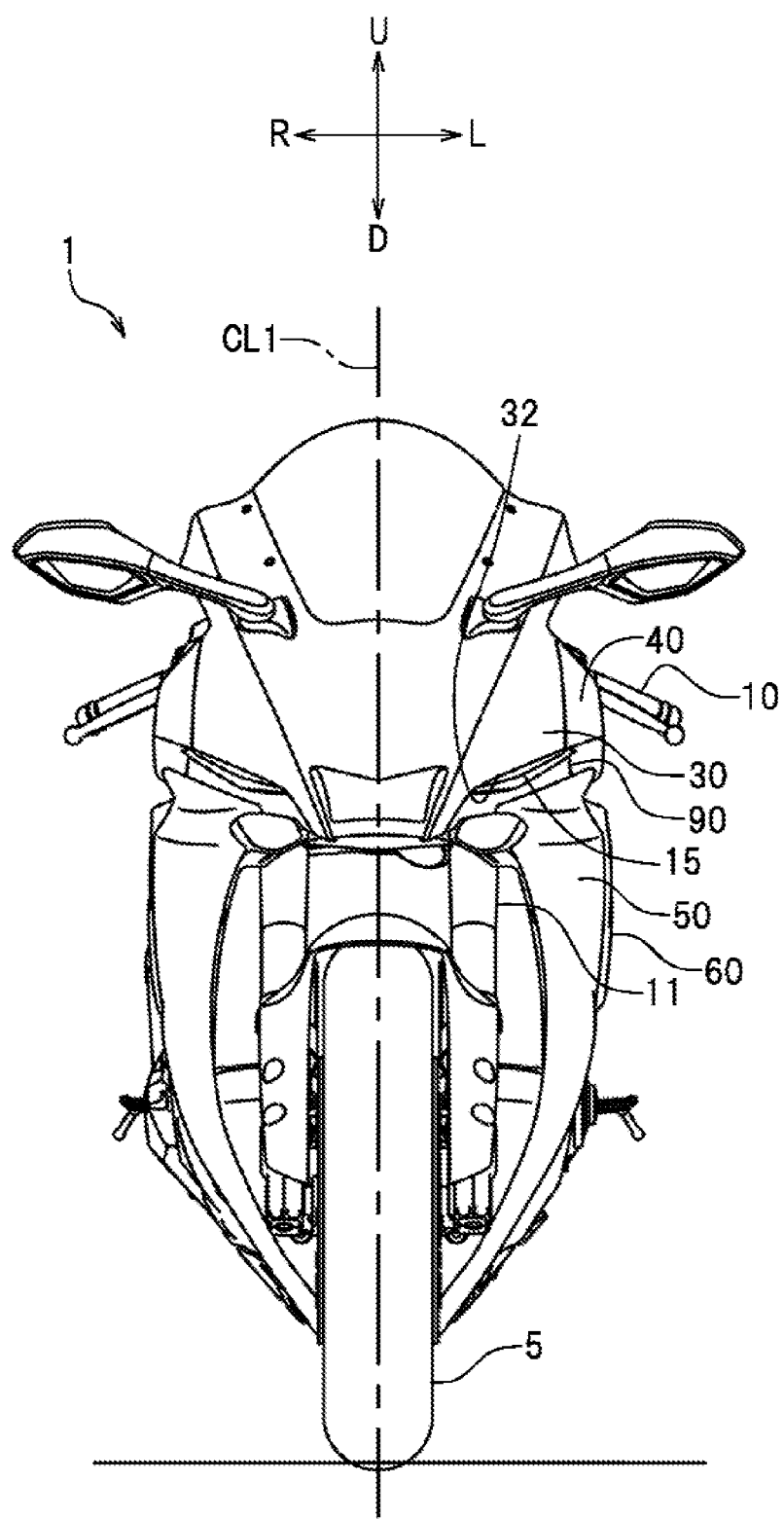
FIG. 2 is a front view of a motorcycle according to an embodiment.

An embodiment of the present invention will now be described with reference to the drawings. FIG. 1 is a left side view of a motorcycle 1 according to the present embodiment. FIG. 2 is a front view of the motorcycle 1.

Figure 13:
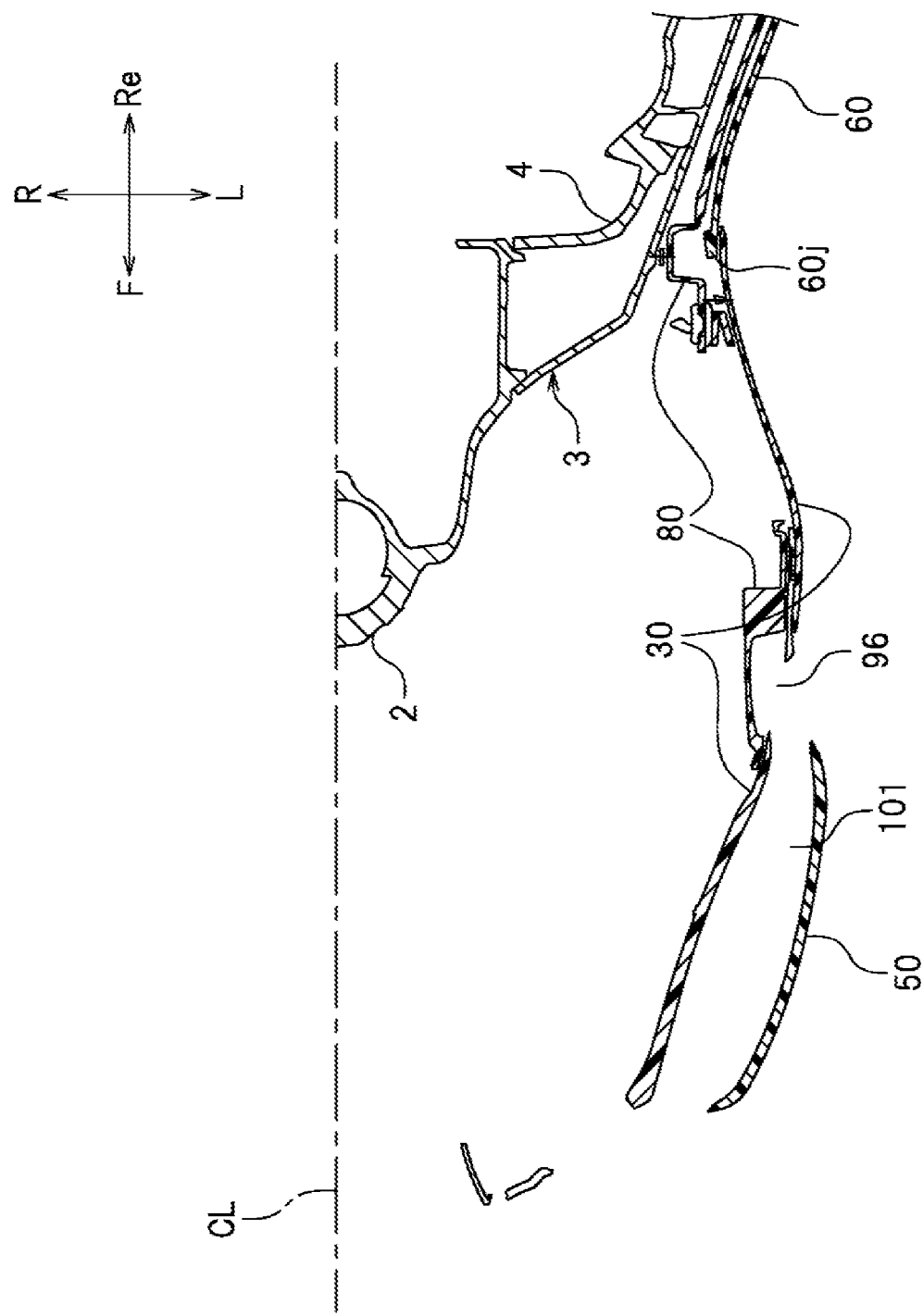
FIG. 13 is a cross-sectional view taken along line XIII-XIII of FIG. 4.

The terms front, rear, left, right, up and down, as used in the description below, refer to these directions as seen from a virtual rider seated on a seat 17 while the motorcycle 1 is standing upright on a horizontal surface with no rider and no load thereon, unless specified otherwise. The designations F, Re, L, R, U and D, as used in the figures, refer to front, rear, left, right, up and down, respectively. Unless specified otherwise, the term "front/forward" refers not only to the direction that extends in the front direction along the vehicle center line CL (see FIG. 13 and FIG. 14), as the vehicle is seen from above, but also to directions that are inclined left/right from that direction by an angle that is less than or equal to 45 degrees. Similarly, the term "rear/rearward" refers not only to the direction that extends rearward along the vehicle center line CL, as the vehicle is seen from above, but also to directions that are inclined left/right from that direction by an angle of 45 degrees or less. The term "left/leftward" refers not only to the direction that extends leftward vertical to the vehicle center line CL, as the vehicle is seen from above, but also to directions that are inclined frontward/rearward from that direction by an angle of 45 degrees or less. The term "right/rightward" refers not only to the direction that extends rightward vertical to the vehicle center line CL, as the vehicle is seen from above, but also to directions that are inclined frontward/rearward from that direction by an angle of 45 degrees or less. The term "up/upward" refers not only to the vertically upward direction, as the vehicle is seen from sideways, but also to directions that are inclined frontward/rearward from that direction by an angle of 45 degrees or less. The term "down/downward" refers not only to the vertically downward direction, as the vehicle is seen from sideways, but also to directions that are inclined frontward/rearward from that direction by an angle of 45 degrees or less.

As shown in FIG. 1, the motorcycle 1 includes a vehicle frame 3, a front wheel 5, a rear wheel 6, an internal combustion engine (hereinafter "engine") 7, a radiator 8 and an electronic control unit (hereinafter "ECU") 9. The motorcycle 1 includes a fuel tank 16 supported on the vehicle frame 3, and the seat 17 supported on the vehicle frame 3. The seat 17 is arranged rearward of the fuel tank 16.

The vehicle frame 3 includes a head pipe 2, and a main frame 4 extending downward and rearward from the head pipe 2. A steering shaft (not shown), to which a handle 10 is secured, is supported on the head pipe 2 so that the steering shaft is able to pivot left and right. Steering shaft is secured to a front fork 11.

The front wheel 5 is supported on the front fork 11. The rear wheel 6 is supported on a rear end portion of a rear arm 12. The front end portion of the rear arm 12 is supported by a pivot shaft 13 so that the rear arm 12 is able to pivot up and down relative to the main frame 4. The front wheel 5 is a driven wheel. The rear wheel 6 is a driving wheel that is driven by the engine 7. The engine 7 and the rear wheel 6 are linked by a chain 14. The chain 14 is an example of a power transmission member. Note however that the power transmission member that transmits the power of the engine 7 to the rear wheel 6 is not limited to the chain 14, but it may be a transmission belt, a drive shaft, etc.

The engine 7 is supported on the vehicle frame 3. The engine 7 includes a crankcase 7A accommodating a crankshaft (not shown) therein, a cylinder body 7B connected to the crankcase 7A (see FIG. 3), and a cylinder head 7C connected to the cylinder body 7B. Although not shown in the figures, a cylinder that slidably accommodates a piston therein is provided inside the cylinder body 7B. An intake port and an exhaust port (not shown) are formed inside the cylinder head 7C. The engine 7 is a water-cooled internal combustion engine. Although not shown in the figures, the cylinder body 7B and the cylinder head 7C are formed with a water jacket through which the coolant passes.

The radiator 8 is connected to the engine 7 by a hose or a pipe (not shown). A coolant whose temperature has increased by cooling the engine 7 flows into the radiator 8. The radiator 8 exchanges heat between the air passing through the radiator 8 from the front side toward the rear side and the coolant inside the radiator 8. The coolant inside the radiator 8 is cooled by the air outside the radiator 8. Conversely, the air outside the radiator 8 is heated by the coolant inside the radiator 8. The cooled coolant is passed from the radiator 8 to the engine 7 to again cool the engine 7. The heated air flows toward the rear side from the radiator 8.

Figure 3:
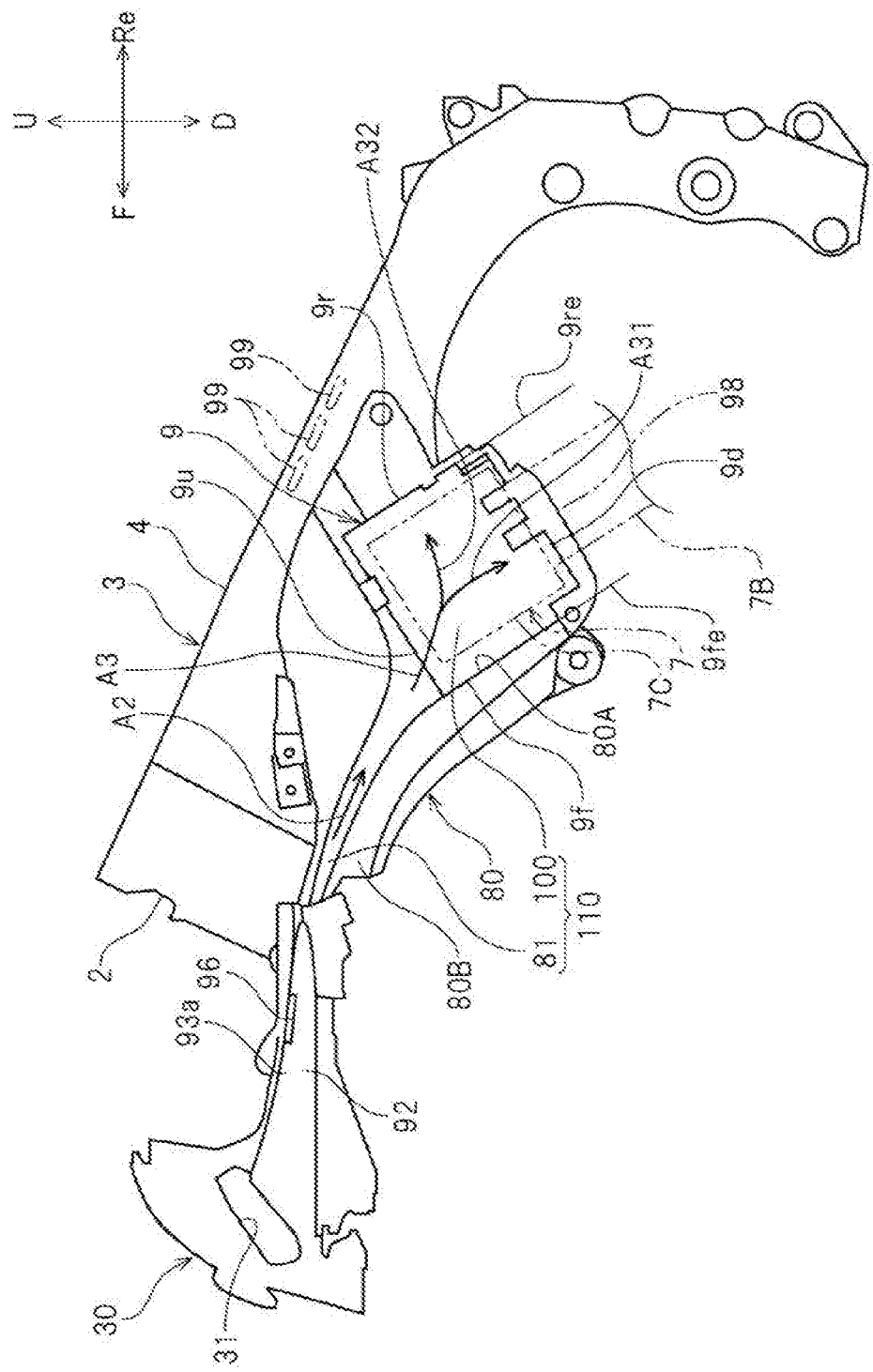
FIG. 3 is a left side view of a vehicle frame, a front cover, a support cover and an ECU.

The ECU 9 is a vehicle part that controls the engine 7, for example. The ECU 9 includes an electronic circuit (not shown), etc. There is no limitation on the shape and the size of the ECU 9. As shown in FIG. 3, the ECU 9 is formed in a rectangular shape as the vehicle is seen from the side. The ECU 9 has a front edge 9f, a rear edge 9r, an upper edge 9u and a lower edge 9d. At least a portion of the ECU 9 overlaps with the engine 7 as the vehicle is seen from the side. Herein, a portion of the ECU 9 overlaps with the cylinder head 7C as the vehicle is seen from the side.

Note that the rectangular shape as used herein is not limited to a rectangular shape in a strict sense but includes shapes that resemble a rectangular shape. In the present embodiment, the front edge 9f, the rear edge 9r and the upper edge 9u are formed to be linear as the vehicle is seen from the side, but the lower edge 9d is provided with indentations. Such a shape is included in the rectangular shape. Although not shown the figures, the four corners of the ECU 9 may be rounded, for example.

As shown in FIG. 1, the motorcycle 1 includes a front cover 30, an upper cover 40, an under cover 50, an outer cover 60 and a rear cover 70. As shown in FIG. 3, the motorcycle 1 further includes a support cover 80.

As shown in FIG. 3, at least a portion of the front cover 30 is arranged forward relative to the head pipe 2. The front cover 30 includes a hole 31 through which a headlight 15 (see FIG. 2) is inserted. As shown in FIG. 2, the front cover 30 includes an air introduction port 32 whose opening is facing forward as the vehicle is seen from the front.

Figure 4:
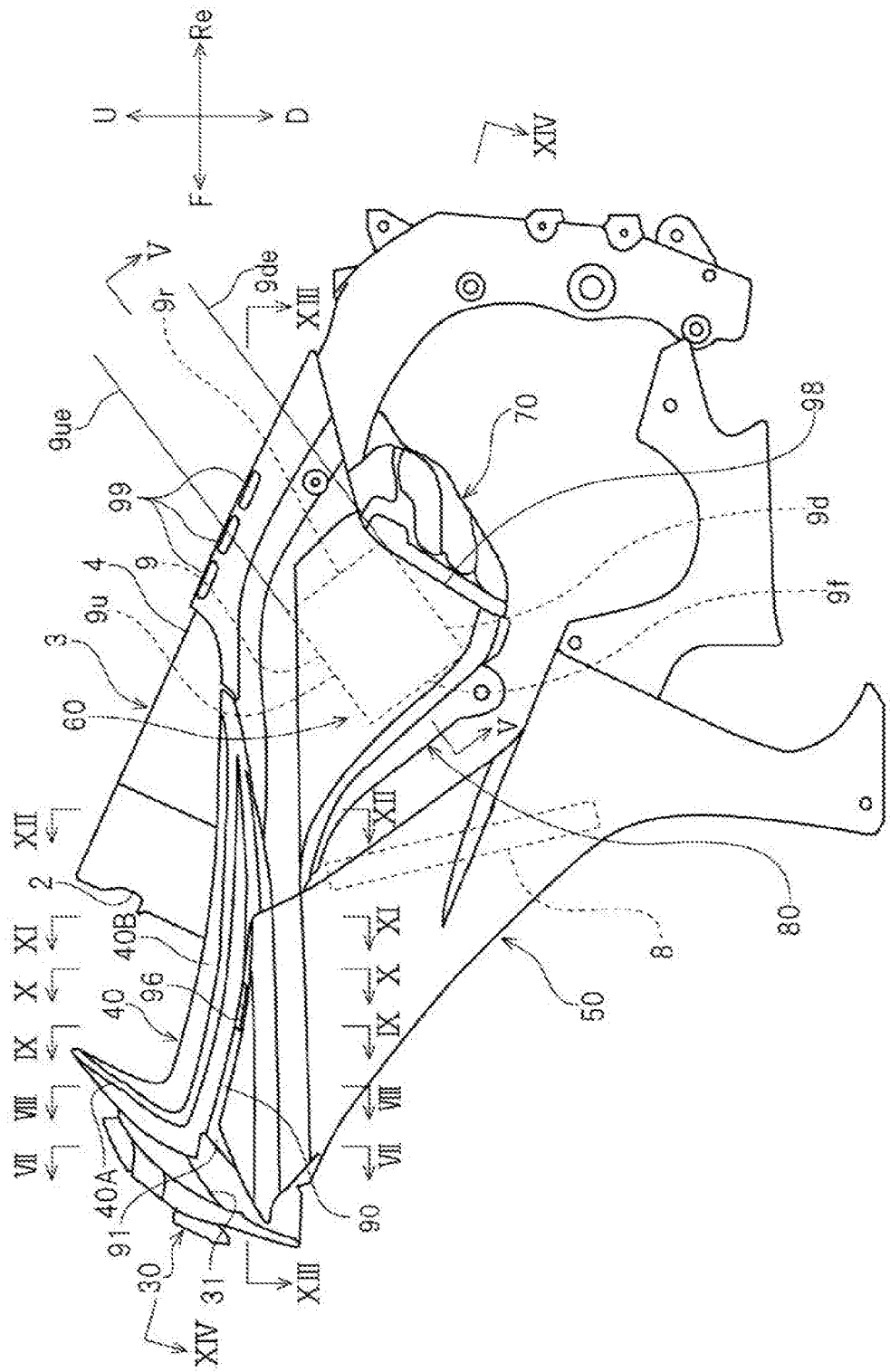
FIG. 4 is a left side view of a main part of a motorcycle.

FIG. 4 is a left side view of a main part of the motorcycle 1. Specifically, FIG. 4 is a left side view of the head pipe 2, the main frame 4, the front cover 30, the upper cover 40, the under cover 50, the outer cover 60, the support cover 80 and the rear cover 70. At least a portion of the upper cover 40 is arranged sideward of the head pipe 2 and upward relative to the radiator 8. The upper cover 40 includes a vertical portion 40A extending upward, and a horizontal portion 40B extending rearward from the lower end of the vertical portion 40A.

At least a portion of the under cover 50 is arranged sideward of the head pipe 2 and downward of the upper cover 40. The under cover 50 extends in a diagonal rear lower direction.

As shown in FIG. 3, the support cover 80 is arranged sideward of the engine 7. The support cover 80 supports the ECU 9. The ECU 9 is arranged leftward of the support cover 80. The ECU 9 is arranged outward in the vehicle width direction of the support cover 80. Note that the term "outward in the vehicle width direction" refers to the direction away from the vehicle center line CL (see FIG. 13 and FIG. 14). The term "inward in the vehicle width direction" refers to the direction toward the vehicle center line CL. The vertical line CL1 of FIG. 2 is a vertical line that is perpendicular to the vehicle center line CL. The support cover 80 is arranged between the engine 7 and the ECU 9 (see FIG. 5). The support cover 80 serves to support the ECU 9 and block the ECU 9 from the heat of the engine 7. With the support cover 80 arranged between the engine 7 and the ECU 9, the ECU 9 is prevented from being heated directly from the engine 7. The support cover 80 includes a control unit attachment portion 80A to which the ECU 9 is attached.

Figure 5:
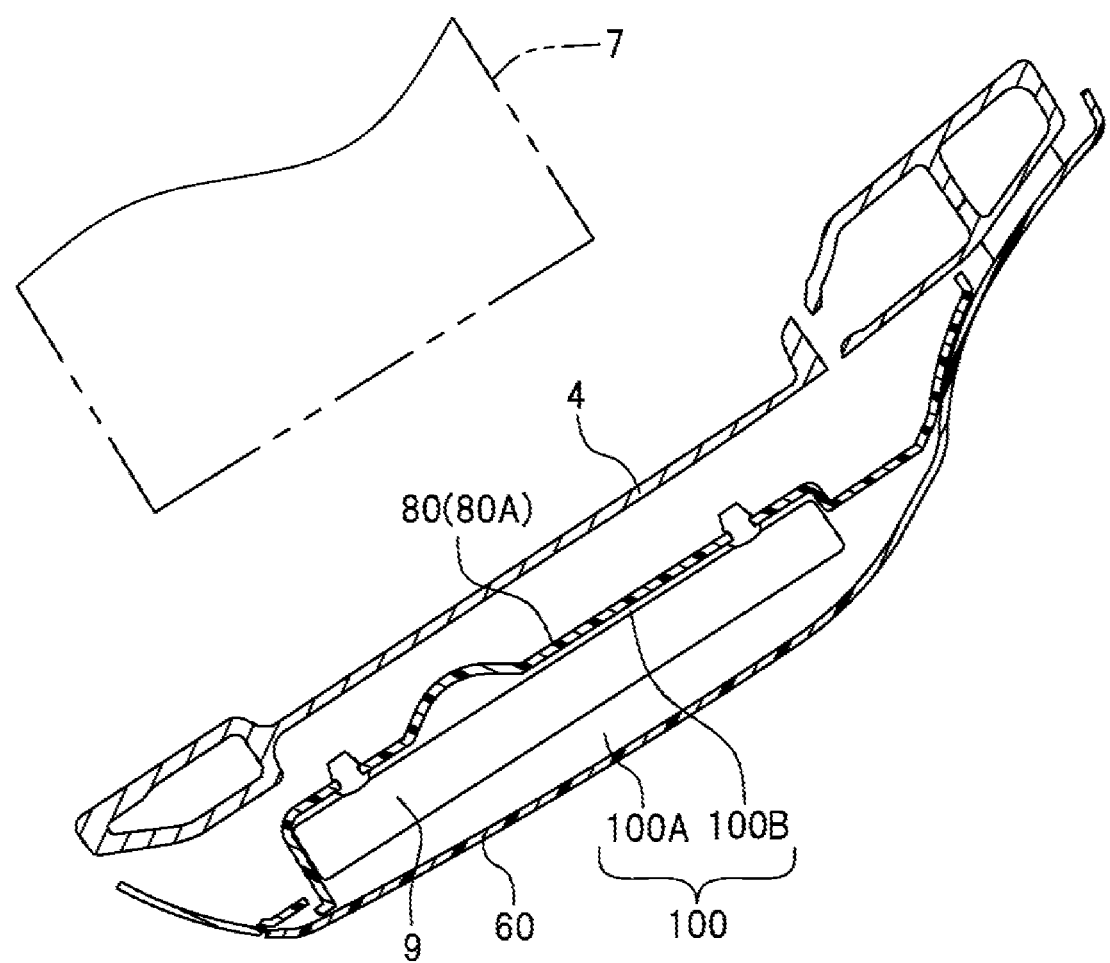
FIG. 5 is a cross-sectional view taken along line V-V of FIG. 4.

As shown in FIG. 4, the outer cover 60 is arranged outward in the vehicle width direction of the support cover 80 and the ECU 9. The outer cover 60 is arranged leftward of the support cover 80 and the ECU 9. The outer cover 60 covers the outside of the ECU 9 in the vehicle width direction. FIG. 5 is a cross-sectional view taken along line V-V of FIG. 4. A cooling passage 100 through which the air for cooling the ECU 9 passes is formed between the control unit attachment portion 80A of the support cover 80 and the outer cover 60. At least a portion of the ECU 9 is spaced apart from the control unit attachment portion 80A of the support cover 80 and the outer cover 60. The cooling passage 100 includes a gap 100A between the ECU 9 and the outer cover 60, and a gap 100B between the ECU 9 and the control unit attachment portion 80A of the support cover 80. Note however that there is no particular limitation on the configuration. The cooling passage 100 may include only one of the gaps 100A and 100B.

Figure 10:
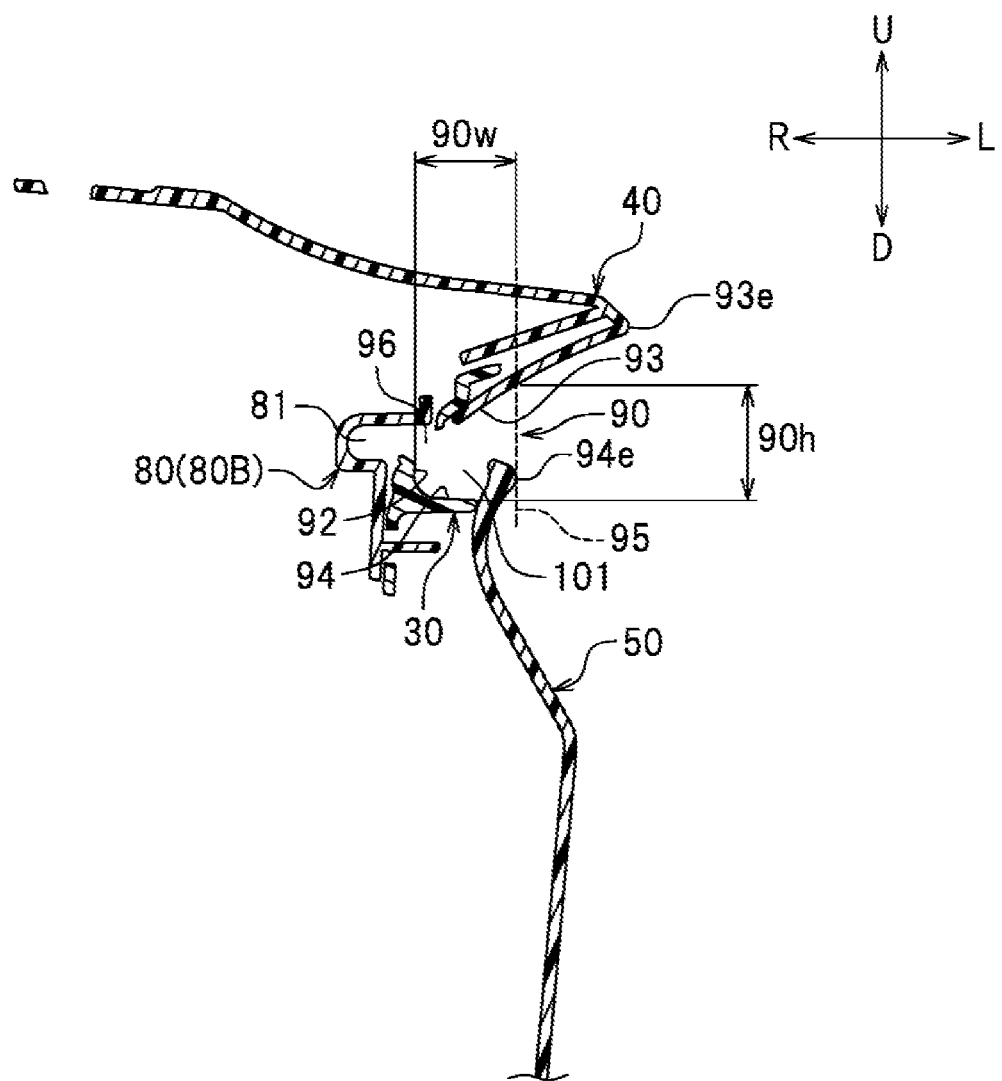
FIG. 10 is a cross-sectional view taken along line X-X of FIG. 4.
Figure 11:
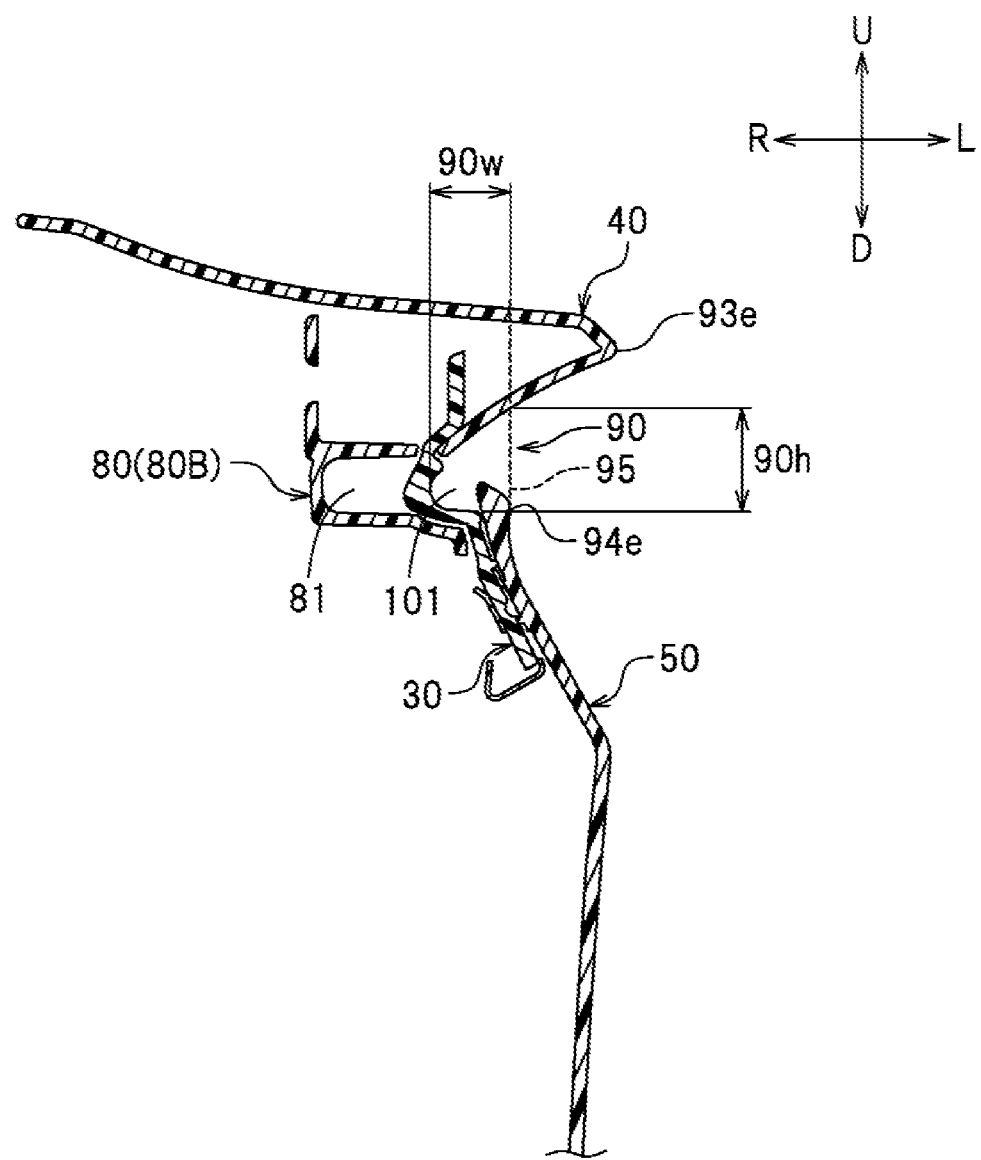
FIG. 11 is a cross-sectional view taken along line XI-XI of FIG. 4.

As shown in FIG. 3, the support cover 80 further includes a guide passage portion 80B provided forward of the control unit attachment portion 80A. A portion of the guide passage portion 80B is arranged inward in the vehicle width direction of the upper cover 40 (see FIG. 10). Another portion of the guide passage portion 80B is arranged inward in the vehicle width direction of the outer cover 60 (see FIG. 12). The guide passage portion 80B includes a guide passage 81 that is depressed inward in the vehicle width direction. The guide passage 81 is connected to the cooling passage 100. The guide passage 81 and the cooling passage 100 form a tubular air passage 110. Where the air passage 110 is formed of a plurality of covers, there may be a gap between the covers. The term "tubular air passage" as used herein includes cases where there is such a gap. That is, the term "tubular air passage" as used herein includes both a tubular air passage whose periphery is airtight and a tubular air passage whose periphery partially has a gap.

As shown in FIG. 4, the rear cover 70 is arranged rearward of the ECU 9. A harness (not shown) is connected to the ECU 9. The harness extends rearward from the ECU 9. The rear cover 70 protects the harness. The rear cover 70 forms a harness cover.

The front cover 30, the upper cover 40 and the under cover 50 form a groove portion 90 that is depressed inward in the vehicle width direction. Herein, the groove portion 90 is depressed rightward. A front end portion 91 of the groove portion 90 is located upward and forward relative to the radiator 8. As shown in FIG. 2, the groove portion 90 has its opening facing forward as the vehicle is seen from the front. As shown in FIG. 4, the front end portion 91 of the groove portion 90 has its opening facing forward as the vehicle is seen from the side. Therefore, as the motorcycle 1 runs, the air flows toward the groove portion 90 from the front side.

Figure 6:
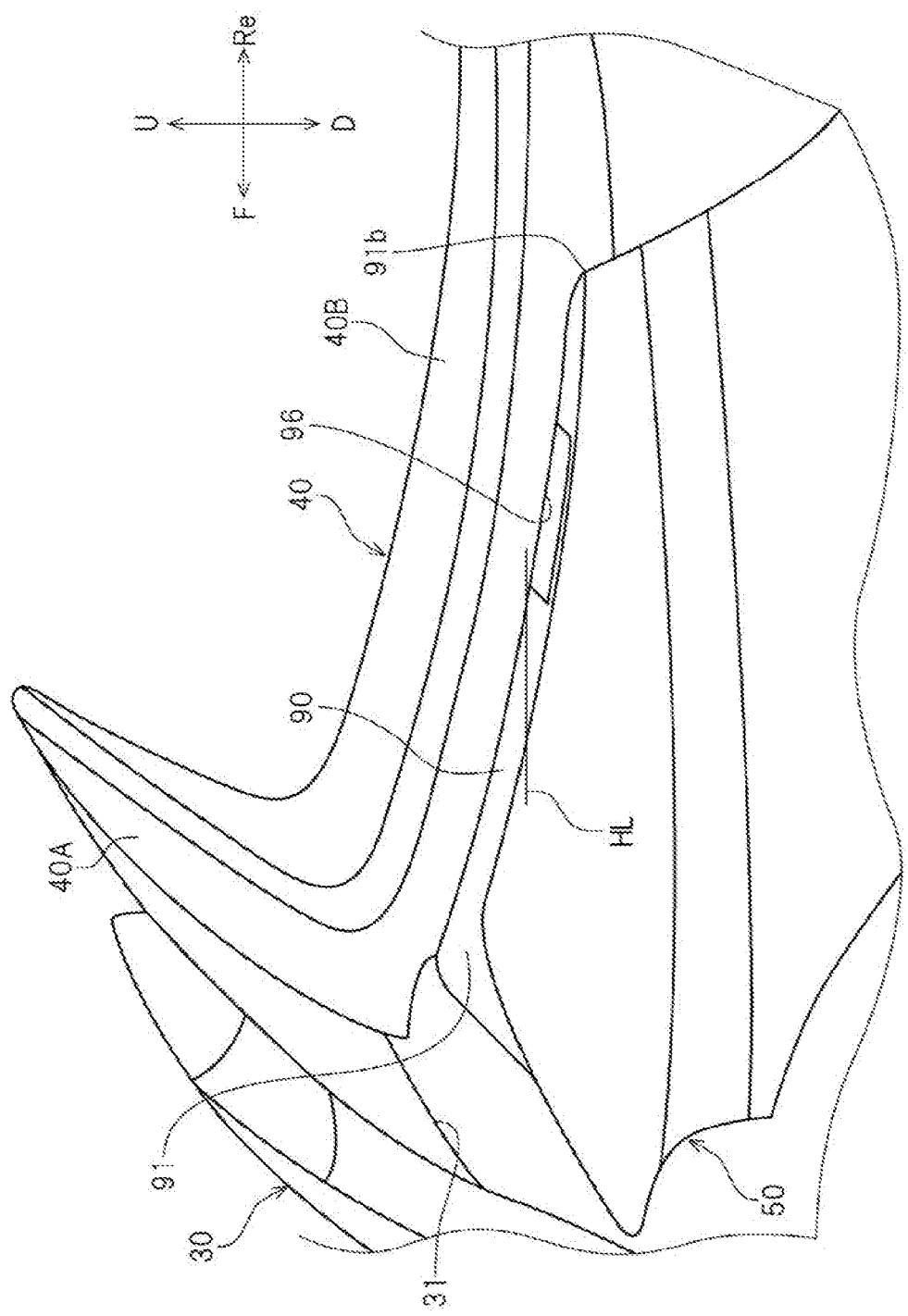
FIG. 6 is an enlarged left side view of a main part of a motorcycle.
Figure 7:
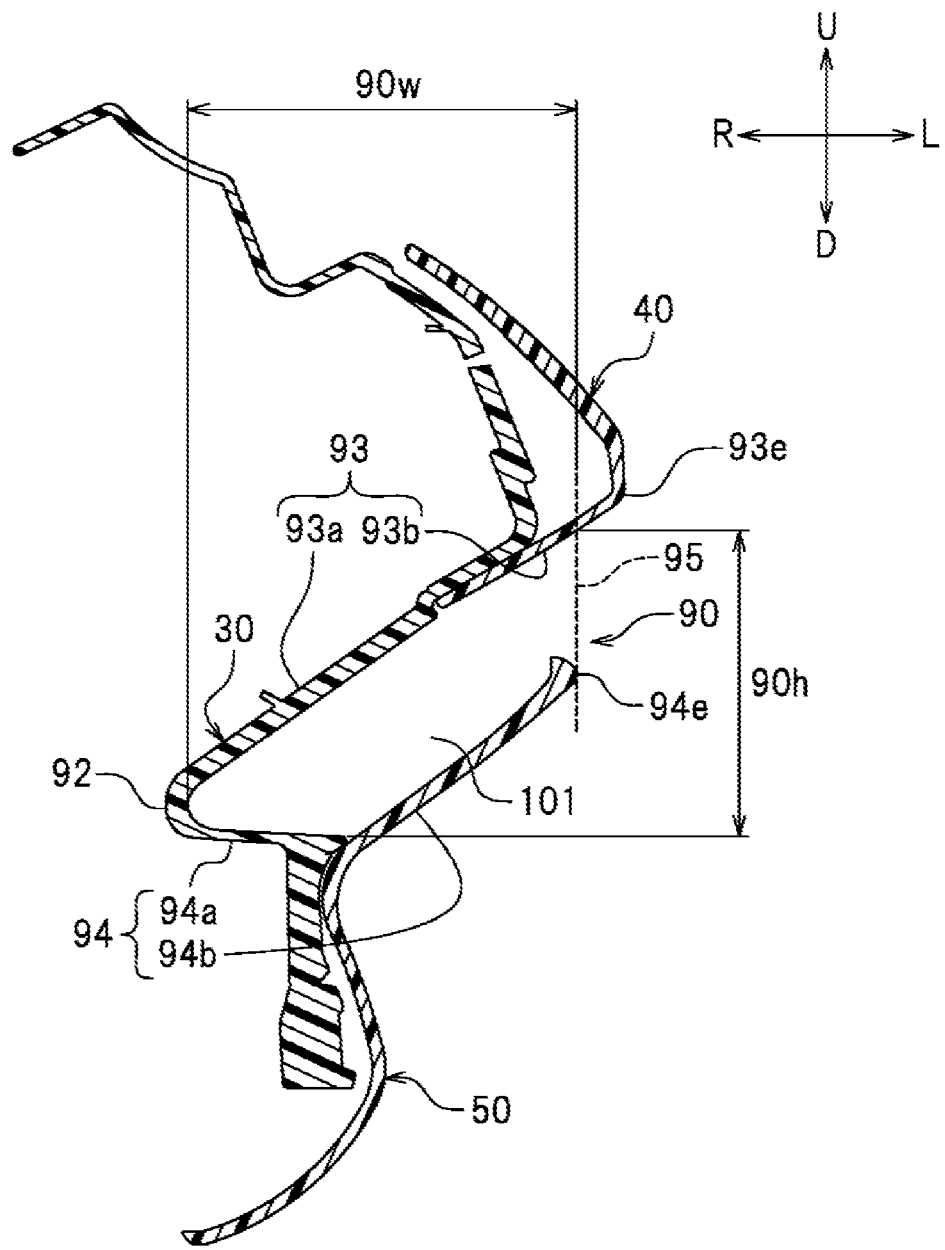
FIG. 7 is a cross-sectional view taken along line VII-VII of FIG. 4.

As shown in FIG. 6, the groove portion 90 extends rearward from the front end portion 91 to a rear end portion 91b. FIG. 7, FIG. 8, FIG. 9, FIG. 10, FIG. 11 and FIG. 12 are a cross-sectional view taken along line VII-VII of FIG. 4, a cross-sectional view taken along line VIII-VIII, a cross-sectional view taken along line IX-IX, a cross-sectional view taken along line X-X, a cross-sectional view taken along line XI-XI and a cross-sectional view taken along line XII-XII, respectively. FIG. 7 to FIG. 12 are vertical cross-sectional views. As shown in FIG. 7, the groove portion 90 includes a vertical wall 92, an upper wall 93 extending outward in the vehicle width direction from the upper end of the vertical wall 92, and a lower wall 94 extending outward in the vehicle width direction from the lower end of the vertical wall 92. Conversely, the groove portion 90 is a portion that is partitioned by the vertical wall 92, the upper wall 93 and the lower wall 94.

Each of the vertical wall 92, the upper wall 93 and the lower wall 94 may be formed of a single member or may be formed of a plurality of members. In the cross section shown in FIG. 7, the upper wall 93 is formed of an upper wall 93a, which is formed of a portion of the front cover 30, and an upper wall 93b, which is formed of a portion of the upper cover 40. The lower wall 94 is formed of a lower wall 94a, which is formed of a portion of the front cover 30, and a lower wall 94b, which is formed of a portion of the under cover 50. That is, the upper wall 93 and the lower wall 94 are each formed of two members.

As the motorcycle 1 runs, the air flows through the groove portion 90 from the front side toward the rear side. The groove portion 90 forms an air passage 101 through which the air flows. Herein, as shown in FIG. 7, in the vertical cross section of the groove portion 90, a region that is surrounded by the vertical wall 92, the upper wall 93, the lower wall 94 and a vertical line 95 is regarded as the air passage 101. Note that the vertical line 95 is a vertical line that passes through one of an outer end 93e of the upper wall 93 in the vehicle width direction and an outer end 94e of the lower wall 94 in the vehicle width direction that is located more inward in the vehicle width direction. Herein, the outer end 94e of the lower wall 94 is located rightward relative to the outer end 93e of the upper wall 93. The outer end 94e of the lower wall 94 is located more inward in the vehicle width direction than the outer end 93e of the upper wall 93. The vertical line 95 passes through the outer end 94e of the lower wall 94.

As shown in FIG. 6, the groove portion 90 includes an inlet opening 96 for the air. The inlet opening 96 is connected to the guide passage 81 (see FIG. 3). The inlet opening 96 communicates with the cooling passage 100 via the guide passage 81. As shown in FIG. 4, the inlet opening 96 is formed upward and forward relative to the radiator 8. The inlet opening 96 is formed in the upper wall 93 of the groove portion 90 (see FIG. 10).

As shown in FIG. 7 to FIG. 11, the dimension 90h of the groove portion 90 in the up-down direction decreases from the front end portion 91 toward the inlet opening 96. The dimension 90w of the groove portion 90 in the vehicle width direction decreases from the front end portion 91 toward the inlet opening 96. The area of passage cross section of the groove portion 90 (in other words, the passage cross-sectional area of the air passage 101) gradually decreases from the front end portion 91 toward the inlet opening 96. The area of passage cross section passing through the center of the inlet opening 96 of the groove portion 90 is smaller than the area of passage cross section passing through the front end portion 91 of the groove portion 90. Note that the area of passage cross section of the groove portion 90 refers to the area of a region of the vertical cross section of the groove portion 90 that is surrounded by the vertical wall 92, the upper wall 93, the lower wall 94 and the vertical line 95. Since the area of passage cross section of the groove portion 90 gradually decreases from the front end portion 91 toward the inlet opening 96, the air flowing through the groove portion 90 is gradually compressed from the front end portion 91 toward the inlet opening 96.

As shown in FIG. 6, the inlet opening 96 is facing outward in the vehicle width direction as the vehicle is seen from the side. Herein, the inlet opening 96 is facing leftward as the vehicle is seen from the side. As shown in FIG. 6, the groove portion 90 is inclined relative to the horizontal line HL so as to descend while extending from the front end portion 91 toward the inlet opening 96. Since the inlet opening 96 is formed in the upper wall 93, the inlet opening 96 has its opening facing forward as the vehicle is seen from the front.

Although there is no limitation on the shape and the dimension of the inlet opening 96, the dimension of the inlet opening 96 in the front-rear direction is greater than either one of the dimension in the left-right direction and the dimension in the up-down direction.

Figure 8:
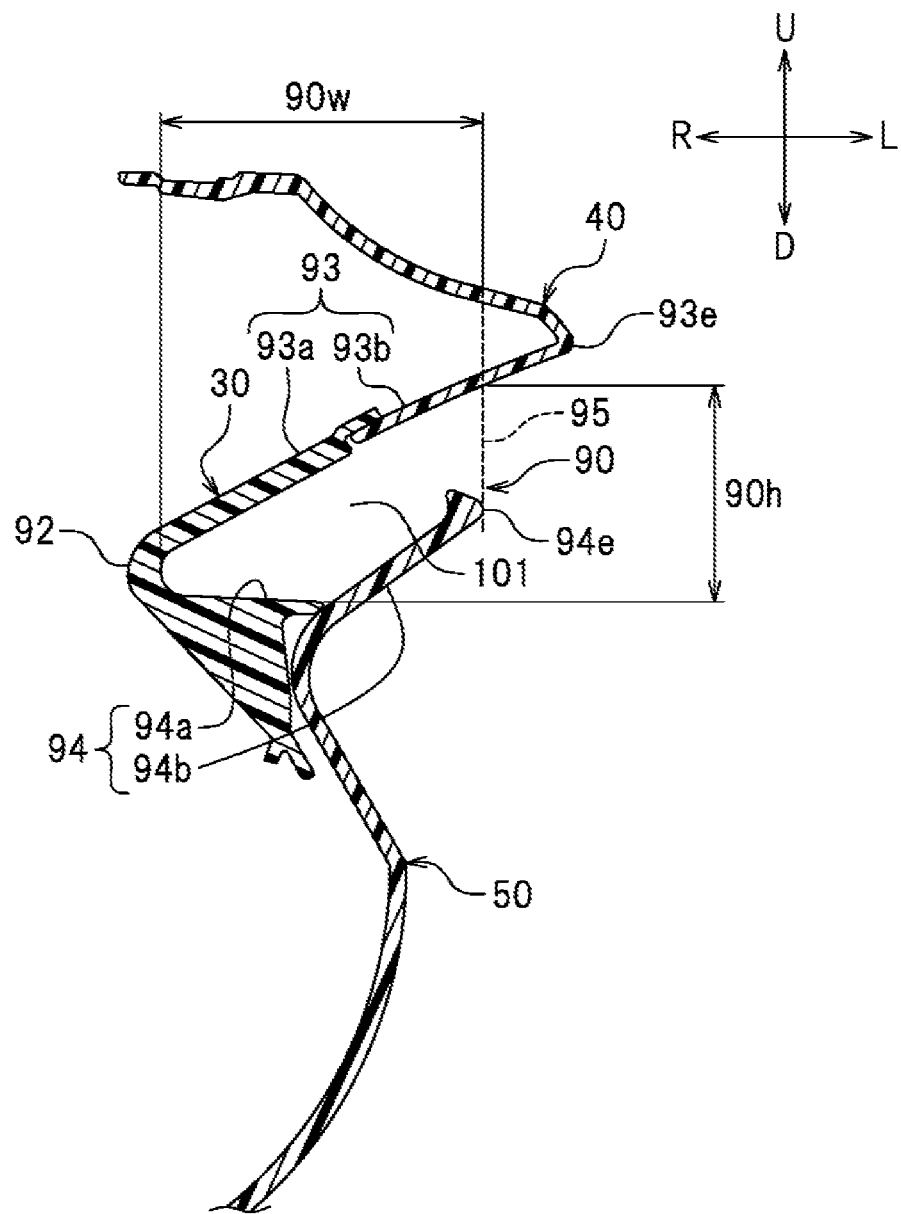
FIG. 8 is a cross-sectional view taken along line VIII-VIII of FIG. 4.
Figure 9:
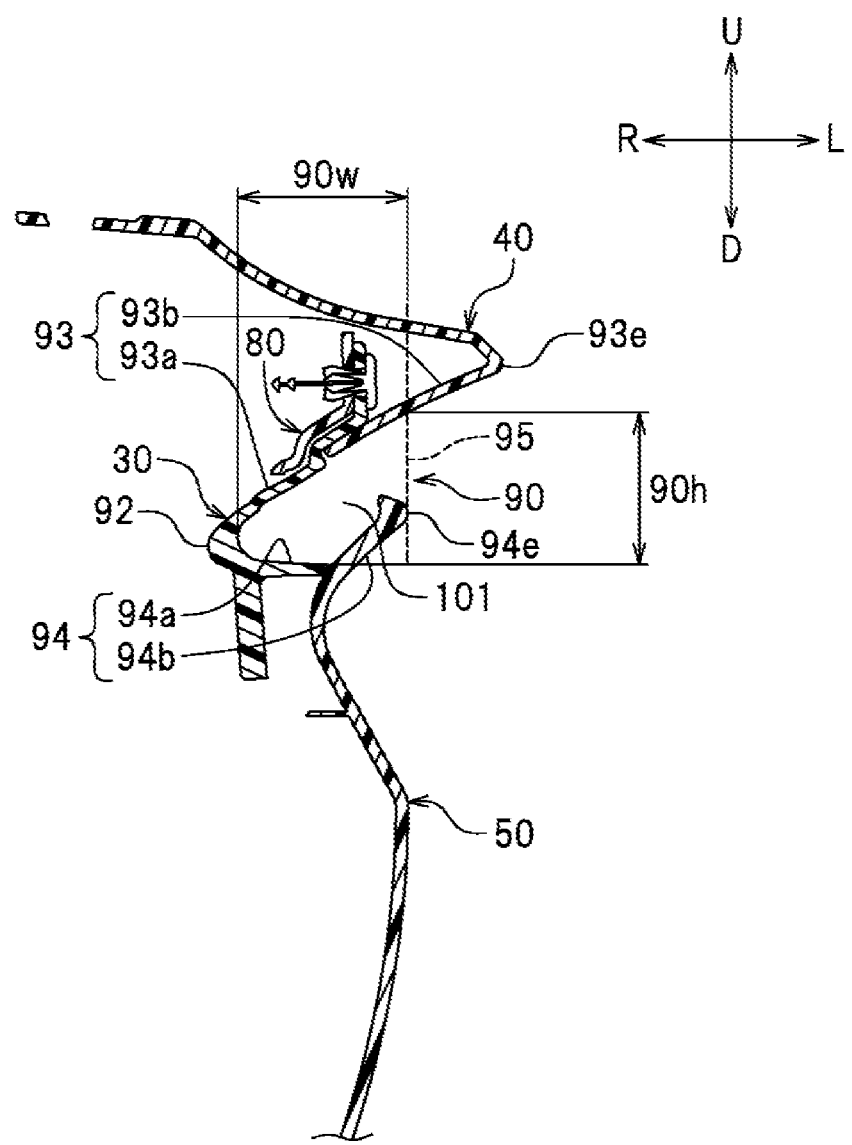
FIG. 9 is a cross-sectional view taken along line IX-IX of FIG. 4.

As shown in FIG. 7 to FIG. 9, the upper end of the under cover 50 is located upward relative to the vertical wall 92 between the front end portion 91 of the groove portion 90 and the inlet opening 96. The outside of the vertical wall 92 in the vehicle width direction is covered by the under cover 50. Note however that there is no particular limitation on the configuration.

Figure 12:
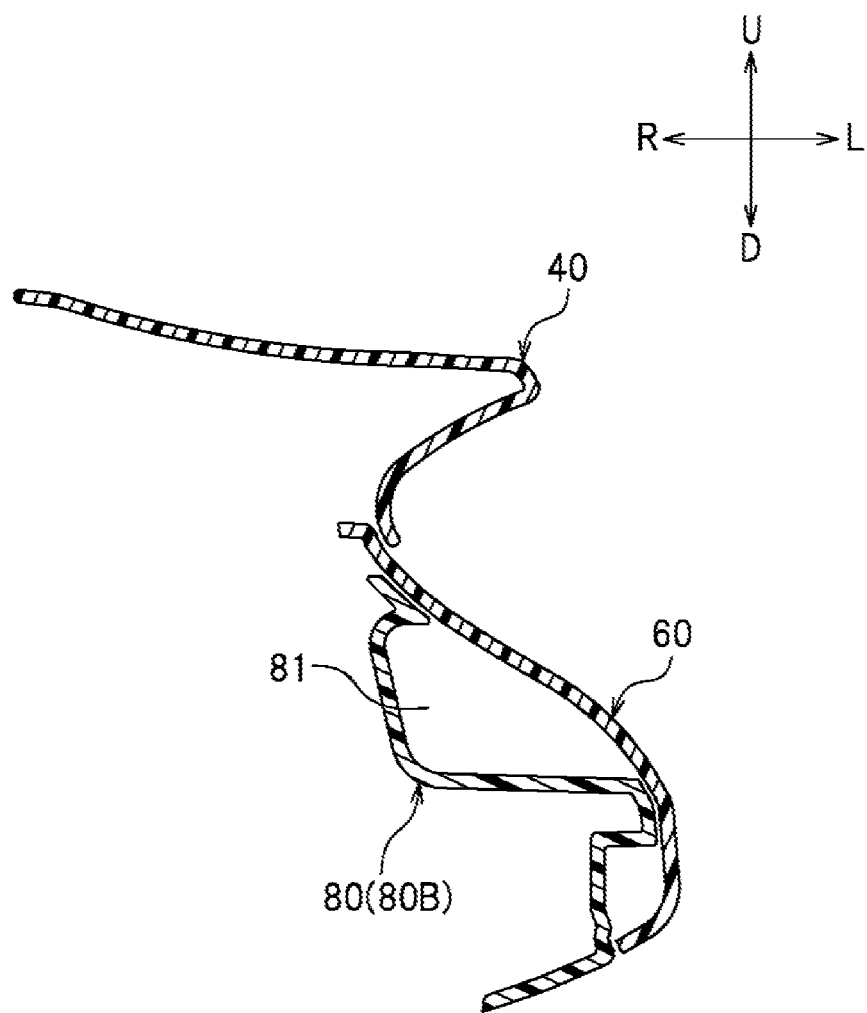
FIG. 12 is a cross-sectional view taken along line XII-XII of FIG. 4.

As shown in FIG. 12, a portion of the guide passage 81 is partitioned by the guide passage portion 80B of the support cover 80 and the outer cover 60. A portion of the outer cover 60 partitions between the guide passage 81 and the outside. The air for cooling the ECU 9 flows inward of the portion of the outer cover 60 in the vehicle width direction, and the outside air flows outward of the portion of the outer cover 60 in the vehicle width direction.

Figure 14:
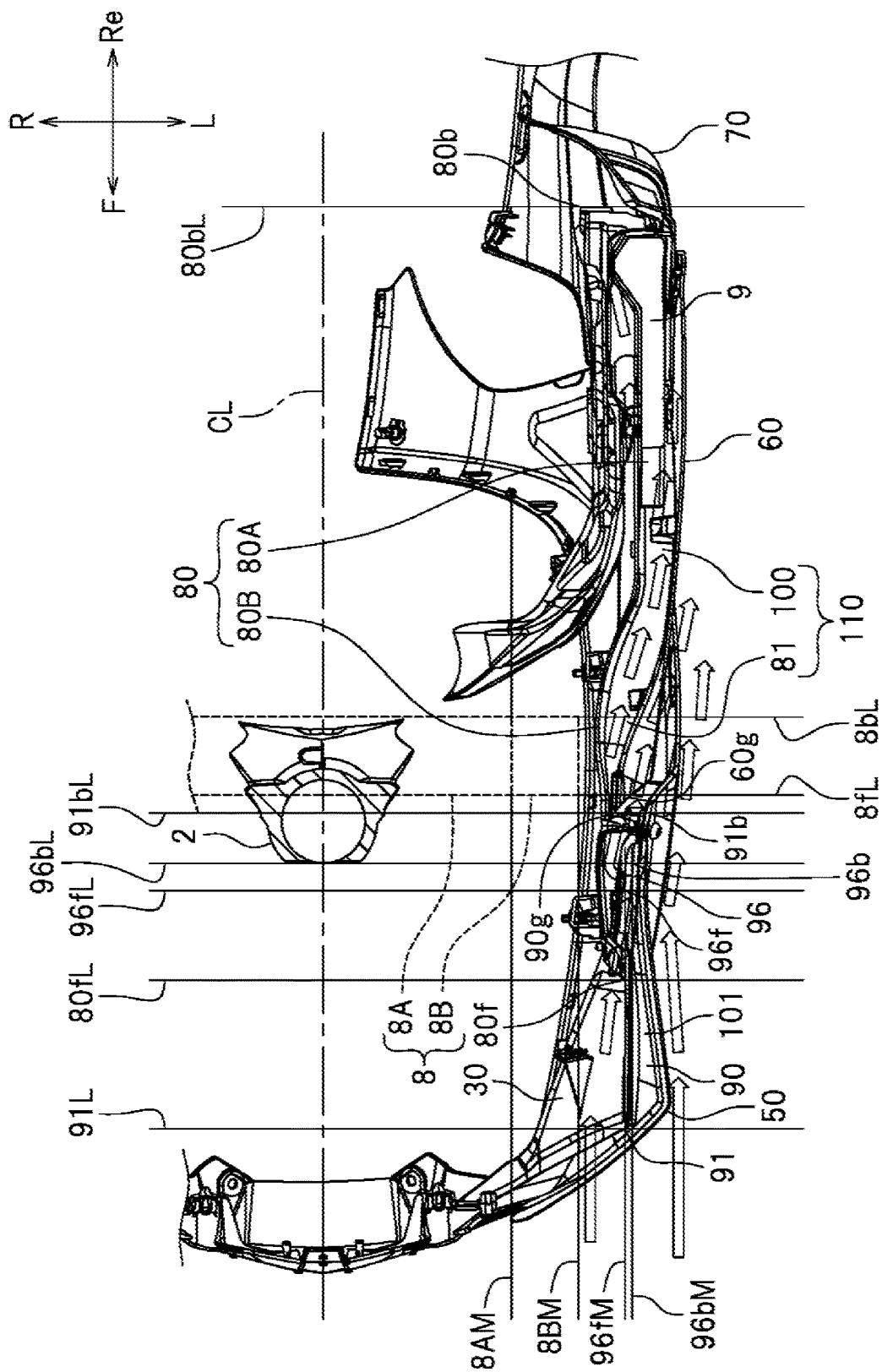
FIG. 14 is a cross-sectional view taken along line XIV-XIV of FIG. 4.

FIG. 14 is a cross-sectional view taken along line XIV-XIV of FIG. 4. As described above, the groove portion 90 is formed by the front cover 30, the upper cover 40 and the under cover 50, and the groove portion 90 defines the air passage 101. The support cover 80 is arranged inward in the vehicle width direction relative to the groove portion 90. The support cover 80, the front cover 30, the upper cover 40 and the outer cover 60 form the tubular air passage 110 through which the air supplied to the ECU 9 passes. The air passage 110 includes the cooling passage 100 that cools the ECU 9, and the guide passage 81 that communicates together the groove portion 90 and the cooling passage 100.

The radiator 8 includes a core portion 8A that exchanges heat between the coolant and the air, a tank portion 8B that is located sideward, left and right, of the core portion 8A, and a bracket portion (not shown). The straight lines 91L and 91bL of FIG. 14 are straight lines respectively indicating the positions in the front-rear direction of the front end portion 91 and the rear end portion 91b of the groove portion 90. The straight lines 80fL and 80bL are straight lines respectively indicating the positions in the front-rear direction of a front end portion 80f and a rear end portion 80b of the support cover 80. The straight lines 96fL and 96bL are straight lines respectively indicating the positions in the front-rear direction of a front end portion 96f and a rear end portion 96b of the inlet opening 96. The straight lines 8fL and 8bL are straight lines respectively indicating the positions in the front-rear direction of the front end portion and the rear end portion of the core portion 8A of the radiator 8. The front end portion 91 of the groove portion 90, the front end portion 80f of the support cover 80, the front end portion 96f of the inlet opening 96, the rear end portion 96b of the inlet opening 96, the front end portion of the core portion 8A of the radiator 8, the rear end portion of the core portion 8A of the radiator 8 and the rear end portion 80b of the support cover 80 are located in this order from the front side toward the rear side. The inlet opening 96 is provided rearward relative to a middle position 91m in the front-rear direction between the front end portion 91 and the rear end portion 91b of the groove portion 90 (see FIG. 16). The distance in the front-rear direction between the rear end portion 96b of the inlet opening 96 and the rear end portion 91b of the groove portion 90 is shorter than the distance in the front-rear direction between the front end portion 96f of the inlet opening 96 and the front end portion 91 of the groove portion 90. The front end portion 96f of the inlet opening 96 is located forward relative to the front end portion of the core portion 8A of the radiator 8. The rear end portion 96b of the inlet opening 96 is located forward relative to the rear end portion of the core portion 8A of the radiator 8. In the present embodiment, the rear end portion 96b of the inlet opening 96 is located forward relative to the front end portion of the core portion 8A of the radiator 8.

The straight lines 8AM and 8BM of FIG. 14 are straight lines respectively indicating the positions in the vehicle width direction of the outer ends of the core portion 8A and the tank portion 8B of the radiator 8. The straight lines 96fM and 96bM are straight lines respectively indicating positions in the vehicle width direction of the front end portion 96f and the rear end portion 96b of the inlet opening 96. The outer end portion of the core portion 8A of the radiator 8 in the vehicle width direction, the outer end portion of the tank portion 8B in the vehicle width direction, the front end portion 96f of the inlet opening 96 and the rear end portion 96b of the inlet opening 96 are located in this order from the inner side toward the outer side in the vehicle width direction. The front end portion 96f of the inlet opening 96 is located inward in the vehicle width direction relative to the rear end portion 96b of the inlet opening 96. The front end portion 96f of the inlet opening 96 is located outward in the vehicle width direction relative to the outer end portion of the core portion 8A of the radiator 8 in the vehicle width direction. The front end portion 96f of the inlet opening 96 is located outward in the vehicle width direction relative to the outer end portion of the tank portion 8B of the radiator 8 in the vehicle width direction. The air flowing along the groove portion 90 (i.e., the air flowing through the air passage 101) is introduced into the air passage 110 at a position that is less influenced by the radiator 8.

Figure 15:
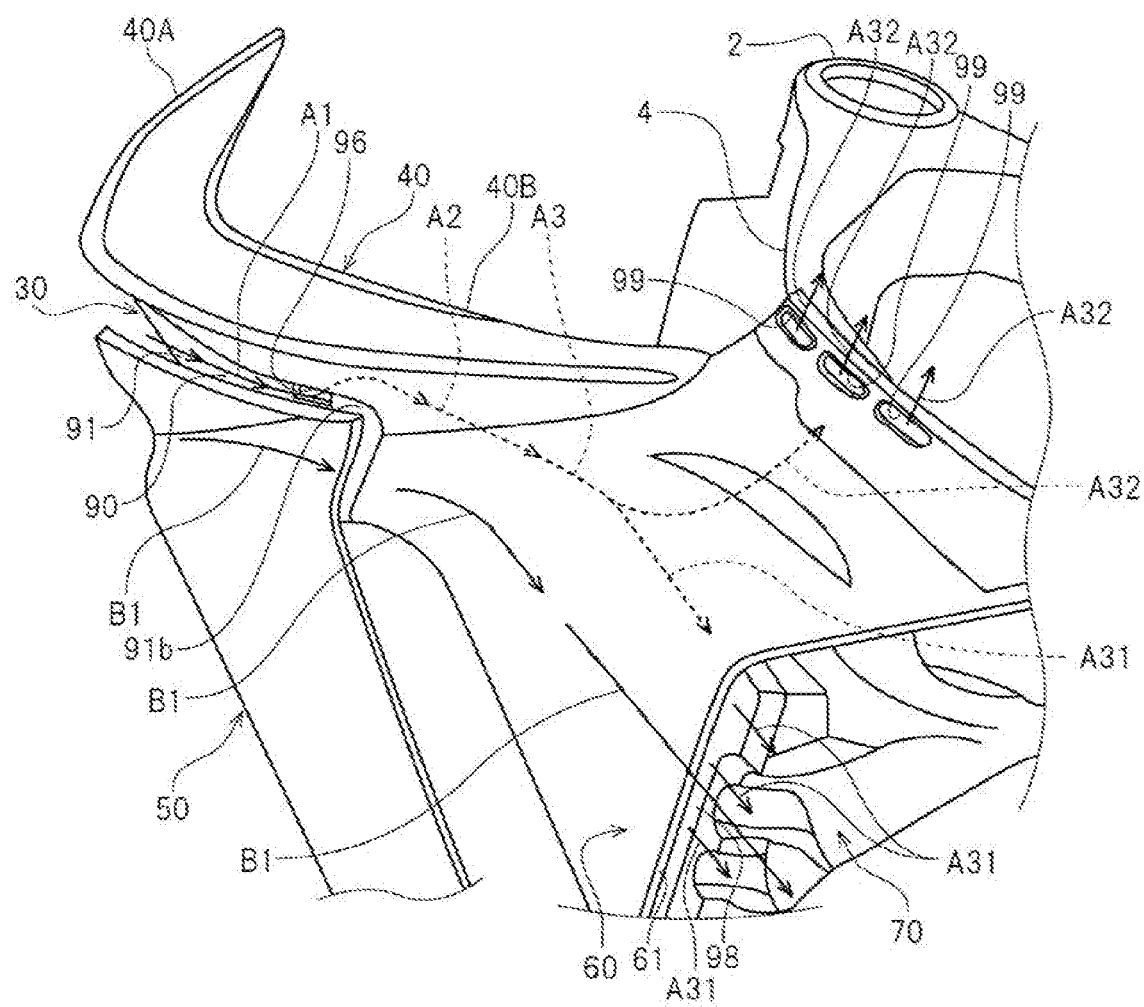
FIG. 15 is a perspective view of a main part of a motorcycle.

FIG. 15 is a perspective view showing a main part of the motorcycle 1 as seen from a diagonal rear upper direction. As shown in FIG. 15, a rear edge portion 61 of the outer cover 60 is spaced apart from the rear cover 70 in the outward direction in the vehicle width direction. A gap 98 is formed between the outer cover 60 and the rear cover 70. The gap 98 functions as an outlet port that allows the air to flow out of the air passage 110. Hereinafter, the gap 98 will be referred to as a first outlet port 98.

A second outlet port 99 that allows the air to flow out of the air passage 110 is formed in a portion of the outer cover 60 that is upward relative to the first outlet port 98. Although there is no particular limitation on the number of the second outlet ports 99, the number herein is three. Three second outlet ports 99 are arranged next to each other in the front-rear direction.

As described above with reference to FIG. 3, the ECU 9 is formed in a rectangular shape having the front edge 9f, the rear edge 9r, the upper edge 9u and the lower edge 9d as the vehicle is seen from the side. As the vehicle is seen from the side, at least a portion of the first outlet port 98 is located between the downward extension 9fe of the front edge 9f and the downward extension 9re of the rear edge 9r and downward relative to the lower edge 9d. As shown in FIG. 4, as the vehicle is seen from the side, at least a portion of the second outlet port 99 is located between the rearward extension 9ue of the upper edge 9u and the rearward extension 9de of the lower edge 9d and rearward relative to the rear edge 9r.

The motorcycle 1 is configured as described above. As the motorcycle 1 runs, the air flows through the air passage 101 and the air passage 110, and the ECU 9 is cooled by the air. Next, the flow of the air that is generated from the running of the motorcycle 1 will be described.

As the motorcycle 1 runs, the air flows through the motorcycle 1 from the front side toward the rear side. A portion of the air enters the inside of the groove portion 90 through the front end portion 91 of the groove portion 90. As described above, the area of passage cross section of the groove portion 90 decreases from the front end portion 91 toward the inlet opening 96. Therefore, the air A1 in the groove portion 90 (see FIG. 15) is compressed before reaching the inlet opening 96. A portion of the air A1 flowing through the groove portion 90 flows into the guide passage 81 of the air passage 110 from the inlet opening 96. The air A2 which has flown into the guide passage 81 (see FIG. 3 and FIG. 15) flows into the cooling passage 100 after flowing through the guide passage 81. The air A3 which has flown into the cooling passage 100 (see FIG. 3 and FIG. 15) flows around the ECU 9. The ECU 9 is cooled by the air A3. A portion A31 of the air which has cooled the ECU 9 flows out of the cooling passage 100 through the first outlet port 98, and another portion A32 flows out of the cooling passage 100 through the second outlet port 99.

As shown in FIG. 15, the air B1 which has flown rearward along the surface of the under cover 50 and the outer cover 60 merges with the air A31 which has flown out through the first outlet port 98. The flow velocity of the air B1 is higher than the flow velocity of the air A31. Therefore, the air A31 is accelerated by the air B1, thereby promoting the air 31 to flow out through the first outlet port 98.

Figure 16:
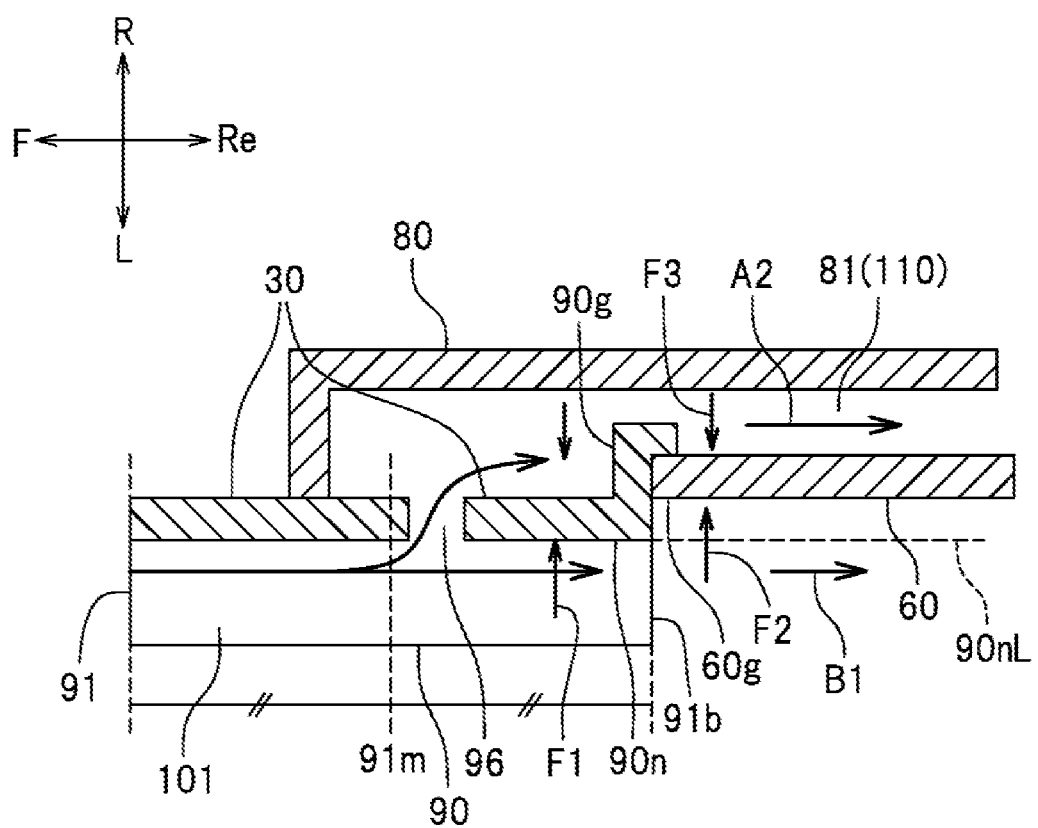
FIG. 16 is a diagram schematically showing a configuration of a part of FIG. 14.

FIG. 16 is a diagram schematically showing a configuration of a part of FIG. 14. A portion of the air flowing rearward along the groove portion 90 (in other words, the air flowing through the air passage 101) flows into the guide passage 81 of the air passage 110 through the inlet opening 96, and the remaining air flows rearward along the outer surface of the outer cover 60 from the rear end portion 91*b* of the groove portion 90. The compressed air passing through the groove portion 90 generates a force F1 pressing the front cover 30 and the upper cover 40 forming the groove portion 90 inward in the vehicle width direction.

In the present embodiment, the outer cover 60 is attached as if it were sandwiched between two of a plurality of covers forming the air passage 101 and the air passage 110. In the cross section shown in FIG. 13, a portion 60*j* of the outer cover 60 is sandwiched between the support cover 80 and the front cover 30. Note that a portion of the outer cover 60 may be sandwiched between the upper cover 40 and the support cover 80 or may be sandwiched between the front cover 30 and the upper cover 40.

As shown in FIG. 16, a bent portion 90*g* that is bent inward in the vehicle width direction is provided at the rear end portion 91*b* of the groove portion 90. Herein, a portion of the front cover 30 forms the bent portion 90*g*. Note however that a different cover may form the bent portion 90*g*. A front end portion 60*g* of the outer cover 60 is arranged rearward of the bent portion 90*g*. By connecting the front end portion 60*g* of the outer cover 60 to the bent portion 90*g*, the front end portion 60*g* of the outer cover 60 is arranged inward in the vehicle width direction relative to an inner edge portion 90*n* of the groove portion 90 (note that the straight line 90*n*L is a straight line indicating the position of the inner edge portion 90*n* in the vehicle width direction). Therefore, a portion of the compressed air flowing through the groove portion 90 that reaches the rear end portion 91*b* of the groove portion 90 flows rearward without hitting the combined surface between the outer cover 60 and the front cover 30 (see arrow B1 of FIG. 16). The outer cover 60 is curved outward in the vehicle width direction while extending rearward from the front end portion 60*g* (see FIG. 14). The air B1 flowing along the outer surface of the outer cover 60 generates a force F2 pressing the outer cover 60 inward in the vehicle width direction.

On the other hand, the guide passage 81 is bent outward in the vehicle width direction while extending rearward (see FIG. 14). Therefore, the air A2 flowing into the guide passage 81 through the inlet opening 96 presses the outer cover 60 outward in the vehicle width direction while flowing through the guide passage 81. Therefore, the air A2 flowing through the guide passage 81 generates a force F3 urging to pull off the outer cover 60 outward in the vehicle width direction.

However, the flow velocity of the air A2 flowing through the guide passage 81 is greater than the flow velocity of the air B1 flowing along the outer surface of the outer cover 60. Therefore, the pressure of the air A2 in the guide passage 81, i.e., the pressure of the air A2 inside the outer cover 60, is smaller than the pressure of the air B1 outside the outer cover 60. As a result, due to the pressure difference between the inside and the outside of the outer cover 60 consequently applies a force on the outer cover 60 from the outer side to the inner side in the vehicle width direction. Therefore, without increasing the rigidity of a member that supports the outer cover 60 or the outer cover 60 itself, it is possible to prevent the outer cover 60 from coming off outward in the vehicle width direction.

As described above, with the motorcycle 1 according to the present embodiment, the ECU 9 is arranged sideward of the engine 7, but the support cover 80 is arranged between the engine 7 and the ECU 9 (see FIG. 5). Thus, the ECU 9 is prevented from being heated directly by the engine 7. With the motorcycle 1, as shown in FIG. 1, the front cover 30, the upper cover 40 and the under cover 50 together form the groove portion 90 through which the air flows while running. The air flows rearward from the front end portion 91 of the groove portion 90. Herein, the front end portion 91 of the groove portion 90 is located upward and forward relative to the radiator 8. Therefore, the air not influenced by the heat of the radiator 8 flows into the groove portion 90. Then, at least a portion of the air which has flown through the groove portion 90 is guided into the tubular air passage 110, at least a portion of which is formed between the support cover 80 and the outer cover 60, through the inlet opening 96. As shown in FIG. 3, the air flows around the ECU 9, thereby cooling the ECU 9. With the motorcycle 1 according to the present embodiment, the air not influenced by the heat generated from the radiator 8 or the heated exhaust air having been passing through the radiator 8 flows through the air passage 110 for cooling the ECU 9. Therefore, it is possible to effectively cool the ECU 9.

With the motorcycle 1 according to the present embodiment, the area of passage cross section passing through the center of the inlet opening 96 of the groove portion 90 is smaller than the area of passage cross section passing through the front end portion 91. The air introduced into the groove portion 90 is compressed while reaching the inlet opening 96 from the front end portion 91. Then, the compressed air is guided into the air passage 110 through the inlet opening 96. Since the amount of air flowing through the air passage 110 increases, it is possible to effectively cool the ECU 9.

The inlet opening 96 formed in the groove portion 90 is located upward and forward relative to the radiator 8. The inlet opening 96 is located forward and outward in the vehicle width direction relative to the radiator 8. Therefore, the air flowing into the inlet opening 96 is unlikely to be influenced by the heat of the radiator 8. It is possible to further reduce the influence of the heat of the radiator 8 for the air introduced into the air passage 110. Therefore, it is possible to more effectively cool the ECU 9.

Now, the radiator 8 is arranged downward relative to the groove portion 90. One of the vertical wall 92, the upper wall 93 and the lower wall 94 forming the groove portion 90 that is farthest away from the radiator 8 is the upper wall 93. In the present embodiment, the inlet opening 96 is formed in the upper wall 93. In the present embodiment, the air is guided to the air passage 110 from a portion of the groove portion 90 that is away from the radiator 8. Therefore, it is possible to further reduce the influence of the heat of the radiator 8 for the air for cooling the ECU 9. Therefore, it is possible to more effectively cool the ECU 9. The air is guided into the groove portion 90 from the front end portion 91 of the groove portion 90 whose opening is facing forward. Then, dust or rain, etc., may also possibly enter the groove portion 90 together with the air. However, it is not preferred that the ECU 9 is exposed to dust or rain. Being heavier than the air, dust or rain tends to flow through a lower portion of the groove portion 90 as compared with the air. According to the present embodiment, since the inlet opening 96 is formed in the upper wall 93, it is possible to suppress the entry of dust or rain into the air passage 110. Dust or rain is likely to be guided along the lower wall 94 of the groove portion 90 to be discharged rearward of the groove portion 90.

Note however that the portion where the inlet opening 96 is formed is not limited to the upper wall 93. The inlet opening 96 may be formed in the vertical wall 92 or the lower wall 94. While a portion of the air flowing through the groove portion 90 flows into the inlet opening 96, another portion thereof flows rearward past the inlet opening 96. The air flowing through the groove portion 90 flows along the vertical wall 92, the upper wall 93 and the lower wall 94. When the inlet opening 96 is formed in the vertical wall 92, the upper wall 93 or the lower wall 94 of the groove portion 90, the air flowing through the groove portion 90 is unlikely to be hindered by the inlet opening 96. Thus, it is possible to suppress the inlet opening 96 presenting an air resistance.

According to the present embodiment, as shown in FIG. 6, the groove portion 90 is inclined relative to the horizontal line HL so as to descend while extending from the front end portion 91 toward the inlet opening 96. The inlet opening 96 formed in the upper wall 93 is facing forward as the vehicle is seen from the front. Therefore, the air flowing through the groove portion 90 is likely to flow into the inlet opening 96. It is possible to increase the amount of air to be guided to the air passage 110. Therefore, it is possible to more effectively cool the ECU 9. It is also possible to further suppress the entry of dust or rain into the air passage 110.

According to the present embodiment, as shown in FIG. 3, the support cover 80 includes the guide passage portion 80B formed with the guide passage 81, in addition to the control unit attachment portion 80A to which the ECU 9 is attached. The air having flown through the groove portion 90 flows into the guide passage 81 through the inlet opening 96 and is guided to the cooling passage 100 from the guide passage 81. With the guide passage 81 provided forward of the cooling passage 100, it is possible to form the inlet opening 96 at a more forward position. Therefore, the air unlikely to be influenced by the heat of the radiator 8 is introduced into the air passage 110 for cooling the ECU 9. Therefore, it is possible to effectively cool the ECU 9.

According to the present embodiment, as shown in FIG. 15, the first outlet port 98 that allows the air to flow out of the air passage 110 is formed between the outer cover 60 and the rear cover 70. As the motorcycle 1 runs, the air B1 flows rearward on the outer side of the outer cover 60 in the vehicle width direction. The flow of the air B1 serves to suck out the air A31 from the cooling passage 100 through the first outlet port 98. Since the air A31 of the cooling passage 100 is likely to flow out of the first outlet port 98, the flow velocity of the air A31 through the cooling passage 100 is increased. Therefore, it is possible to effectively cool the ECU 9.

According to the present embodiment, the second outlet port 99 is formed in a portion of the outer cover 60 that is upward of the first outlet port 98. The second outlet port 99 is formed, in addition to the first outlet port 98, in the air passage 110. Even when a large amount of air flows into the air passage 110, the air flows out not only through the first outlet port 98 but also through the second outlet port 99, and thus smoothly flows out of the air passage 110. The air is unlikely to stagnate in the air passage 110. Therefore, it is possible to effectively cool the ECU 9.

According to the present embodiment, as shown in FIG. 3, the ECU 9 is formed in a rectangular shape having the front edge 9f, the rear edge 9r, the upper edge 9u and the lower edge 9d as the vehicle is seen from the side. As the vehicle is seen from the side, at least a portion of the first outlet port 98 is located between the downward extension 9fe of the front edge 9f and the downward extension 9re of the rear edge 9r and downward relative to the lower edge 9d. It is made easier for a portion of the air in the cooling passage 100 to flow downward through the lower edge 9d. The air is likely to flow around the ECU 9 in accordance with the shape of the ECU 9. Therefore, it is possible to effectively cool the ECU 9. It is understood, of course, that embodiments of the invention encompass an ECU 9 having any shape, and not only a rectangular shape.

As shown in FIG. 4, as the vehicle is seen from the side, at least a portion of the second outlet port 99 is located between the rearward extension 9ue of the upper edge 9u and the rearward extension 9de of the lower edge 9d and rearward relative to the rear edge 9r. It is made easier for another portion of the air in the cooling passage 100 to flow rearward through the rear edge 9r. The air is likely to flow around the ECU 9 in accordance with the shape of the ECU 9. Therefore, it is possible to effectively cool the ECU 9. While an embodiment is described above in which an air flow is used to cool an ECU 9, embodiments encompass any device or vehicle part which may be cooled, including other electronic devices, control devices, computing devices, or other vehicle parts that do not include electronic elements but would benefit from a cooling air flow to improve performance of the motorcycle 1.

The motorcycle 1 according to one embodiment has been described above. However, the embodiment is merely an example, and various other embodiments are possible. Next, other embodiment examples will be described briefly.

The vehicle part arranged sideward of the engine 7 is not limited to the ECU 9. For example, the vehicle part may be a regulator, a battery, etc. The present invention is able to be applied to various vehicle parts that should be prevented from becoming hot.

The front cover 30, the upper cover 40, the under cover 50, the outer cover 60, the rear cover 70 and the support cover 80 do not always need to be formed of a single member. One or two or more of the front cover 30, the upper cover 40, the under cover 50, the outer cover 60, the rear cover 70 and the support cover 80 may be formed of two or more members. The front cover 30, the upper cover 40, the under cover 50, the outer cover 60, the rear cover 70 and the support cover 80 do not always need to be separate from each other. One or two or more of the front cover 30, the upper cover 40, the under cover 50, the outer cover 60, the rear cover 70 and the support cover 80 may be formed of a single member.

There is no particular limitation on the material of the front cover 30, the upper cover 40, the under cover 50, the outer cover 60, the rear cover 70 and the support cover 80. These materials may be a synthetic resin or may be a metal, for example. Two or more of the front cover 30, the upper cover 40, the under cover 50, the outer cover 60, the rear cover 70 and the support cover 80 may be of the same material or may be of different materials.

The area of passage cross section of the groove portion 90 does not always need to gradually decrease from the front end portion 91 toward the inlet opening 96. For example, the area may gradually decrease from the front end portion 91 toward the inlet opening 96, and then gradually increase and decrease again. The area of passage cross section of the groove portion 90 may be constant or may increase from the front end portion 91 toward the inlet opening 96. The area of passage cross section passing through the center of the inlet opening 96 of the groove portion 90 does not always need to be smaller than the area of passage cross section passing through the front end portion 91.

The dimension of the groove portion 90 in the up-down direction does not always need to decrease from the front end portion 91 toward the inlet opening 96. The dimension of the groove portion 90 in the left-right direction does not always need to decrease from the front end portion 91 toward the inlet opening 96.

The position of the inlet opening 96 is not always limited to be upward and forward relative to the radiator 8. For example, the position of the inlet opening 96 may be rearward relative to the front end of the radiator 8.

As described above, the inlet opening 96 does not always need to be formed in the upper wall 93 of the groove portion 90. The inlet opening 96 may be formed in the vertical wall 92 or the lower wall 94. The inlet opening 96 may be formed to extend from the upper wall 93 to the vertical wall 92 or may be formed to extend from the vertical wall 92 to the lower wall 94.

The groove portion 90 does not always need to be inclined relative to the horizontal line HL so as to descend while extending from the front end portion 91 to the inlet opening 96. The groove portion 90 may be inclined relative to the horizontal line HL so as to ascend while extending from the front end portion 91 to the inlet opening 96. The groove portion 90 may be parallel to the horizontal line HL.

The rear cover 70 is not always necessary. When the rear cover 70 is absent, for example, the gap between the rear edge of the support cover 80 and the rear edge of the outer cover 60 forms the first outlet port 98.

There is no particular limitation on the positions of the first outlet port 98 and the second outlet port 99 relative to the ECU 9. One of the first outlet port 98 and the second outlet port 99 may be omitted. In addition to the first outlet port 98 and the second outlet port 99, another outlet port may be included that allows the air to flow out of the air passage 110.

While the tank portion 8B of the radiator 8 is arranged leftward and rightward of the core portion 8A in the embodiment described above, there is no particular limitation on the configuration. The tank portion 8B may be arranged upward and downward of the core portion 8A.

A straddled vehicle refers to a vehicle that is straddled by a passenger. A straddled vehicle is not limited to the motorcycle 1. A straddled vehicle may be an auto tricycle, an ATV (All Terrain Vehicle), or the like.

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

REFERENCE NUMERAL LIST

1 Motorcycle (straddled vehicle)
2 Head pipe
3 Vehicle frame
7 Internal combustion engine
8 Radiator
9 Electronic control unit (vehicle part)
9$f$ Front edge of electronic control unit
9$r$ Rear edge of electronic control unit
9$u$ Upper edge of electronic control unit
9$d$ Lower edge of electronic control unit
30 Front cover
40 Upper cover
50 Under cover
60 Outer cover
70 Rear cover
80 Support cover
80A Control unit attachment portion (vehicle part attachment portion)
80B Guide passage portion
81 Guide passage
90 Groove portion
91 Front end portion of groove portion
91$b$ Rear end portion of groove portion
92 Vertical wall
93 Upper wall
94 Lower wall
96 Inlet opening
98 First outlet port
99 Second outlet port
100 Cooling passage
110 Air passage

The invention claimed is:

1. A straddled vehicle comprising:
a vehicle frame including a head pipe;
an internal combustion engine supported on the vehicle frame;
a radiator supported on the vehicle frame and arranged forward relative to the internal combustion engine;
a support cover arranged sideward of the internal combustion engine;
a vehicle part supported on the support cover and arranged outward in a vehicle width direction relative to the support cover, wherein at least a portion of the vehicle part overlaps with the internal combustion engine as the vehicle is seen from the side;
a front cover at least a portion of which is arranged forward of the head pipe;
an upper cover at least a portion of which is arranged sideward of the head pipe and upward relative to the radiator;
an under cover at least a portion of which is arranged sideward of the head pipe and downward of the upper cover; and
an outer cover arranged outward of the support cover and the vehicle part in the vehicle width direction, wherein:
a groove portion is formed by at least one of the front cover, the upper cover and the under cover, wherein the groove portion includes a front end portion located upward and forward relative to the radiator and a rear end portion located rearward relative to the front end portion, and wherein the groove portion extends rearward from the front end portion to the rear end portion and is recessed inward in the vehicle width direction;
at least a portion of a tubular air passage through which air supplied to the vehicle part passes is formed by the support cover and the outer cover;
the front end portion of the groove portion has an opening facing forward as the vehicle is seen from the side;
an inlet opening that communicates with the air passage is formed in the groove portion;
the groove portion includes a vertical wall, an upper wall extending outward in the vehicle width direction from an upper end of the vertical wall, and a lower wall extending outward in the vehicle width direction from a lower end of the vertical wall; and
the inlet opening is formed in the upper wall, the vertical wall, or the lower wall.

2. The straddled vehicle according to claim 1, wherein the inlet opening is formed upward and forward relative to the radiator.

3. The straddled vehicle according to claim 1, wherein the inlet opening is formed forward and outward in the vehicle width direction relative to the radiator.

4. The straddled vehicle according to claim 1, wherein: the inlet opening is formed only in the upper wall.

5. The straddled vehicle according to claim 4, wherein the groove portion is inclined relative to a horizontal line so as to descend while extending from the front end portion toward the inlet opening.

6. The straddled vehicle according to claim 1, wherein:
the support cover includes a vehicle part attachment portion to which the vehicle part is attached, and a guide passage portion arranged forward of the vehicle part attachment portion and inward in the vehicle width direction of the upper cover; and
a guide passage that guides air from the inlet opening toward the vehicle part is formed in the guide passage portion.

7. The straddled vehicle according to claim 1, wherein the vehicle part is an electronic control unit that controls the internal combustion engine.

8. A straddled vehicle, comprising:
a vehicle frame including a head pipe;
an internal combustion engine supported on the vehicle frame;
a radiator supported on the vehicle frame and arranged forward relative to the internal combustion engine;
a support cover arranged sideward of the internal combustion engine;
a vehicle part supported on the support cover and arranged outward in a vehicle width direction relative to the support cover, wherein at least a portion of the vehicle part overlaps with the internal combustion engine as the vehicle is seen from the side;
a front cover at least a portion of which is arranged forward of the head pipe;
an upper cover at least a portion of which is arranged sideward of the head pipe and upward relative to the radiator;
an under cover at least a portion of which is arranged sideward of the head pipe and downward of the upper cover; and
an outer cover arranged outward of the support cover and the vehicle part in the vehicle width direction, wherein
a groove portion is formed by at least one of the front cover, the upper cover and the under cover, wherein the groove portion includes a front end portion located upward and forward relative to the radiator and a rear end portion located rearward relative to the front end portion, and wherein the groove portion extends rearward from the front end portion to the rear end portion and is recessed inward in the vehicle width direction;
at least a portion of a tubular air passage through which air supplied to the vehicle part passes is formed by the support cover and the outer cover;
the front end portion of the groove portion has an opening facing forward as the vehicle is seen from the side;
an inlet opening that communicates with the air passage is formed in the groove portion; and
an area of passage cross section passing through a center of the inlet opening of the groove portion is smaller than an area of passage cross section passing through the front end portion of the groove portion.

9. The straddled vehicle according to claim 8, wherein a dimension of the groove portion in an up-down direction decreases from the front end portion toward the inlet opening.

10. The straddled vehicle according to claim 8, wherein a dimension of the groove portion in the vehicle width direction decreases from the front end portion toward the inlet opening.

11. A straddled vehicle, comprising:
a vehicle frame including a head pipe;
an internal combustion engine supported on the vehicle frame;
a radiator supported on the vehicle frame and arranged forward relative to the internal combustion engine;
a support cover arranged sideward of the internal combustion engine;
a vehicle part supported on the support cover and arranged outward in a vehicle width direction relative to the support cover, wherein at least a portion of the vehicle part overlaps with the internal combustion engine as the vehicle is seen from the side;
a front cover at least a portion of which is arranged forward of the head pipe;
an upper cover at least a portion of which is arranged sideward of the head pipe and upward relative to the radiator;
an under cover at least a portion of which is arranged sideward of the head pipe and downward of the upper cover;
an outer cover arranged outward of the support cover and the vehicle part in the vehicle width direction; and
a rear cover arranged rearward of the vehicle part, wherein
a groove portion is formed by at least one of the front cover, the upper cover and the under cover, wherein the groove portion includes a front end portion located upward and forward relative to the radiator and a rear end portion located rearward relative to the front end portion, and wherein the groove portion extends rearward from the front end portion to the rear end portion and is recessed inward in the vehicle width direction;
at least a portion of a tubular air passage through which air supplied to the vehicle part passes is formed by the support cover and the outer cover;
the front end portion of the groove portion has an opening facing forward as the vehicle is seen from the side;
an inlet opening that communicates with the air passage is formed in the groove portion; and
a first outlet port that allows air to flow out of the air passage is formed between the outer cover and the rear cover.

12. The straddled vehicle according to claim 11, wherein a second outlet port that allows air to flow out of the air passage is formed in a portion of the outer cover that is upward relative to the first outlet port.

13. The straddled vehicle according to claim 12, wherein:
- the vehicle part is formed in a rectangular shape having a front edge, a rear edge, an upper edge and a lower edge as the vehicle is seen from the side; and
- at least a portion of the second outlet port is located between a rearward extension of the upper edge and a rearward extension of the lower edge and rearward relative to the rear edge as the vehicle is seen from the side.

14. The straddled vehicle according to claim 11, wherein:
- the vehicle part is formed in a rectangular shape having a front edge, a rear edge, an upper edge and a lower edge as the vehicle is seen from the side; and
- at least a portion of the first outlet port is located between a downward extension of the front edge and a downward extension of the rear edge and downward relative to the lower edge as the vehicle is seen from the side.

\* \* \* \* \*